(12) United States Patent
Horita

(10) Patent No.: US 9,055,264 B2
(45) Date of Patent: Jun. 9, 2015

(54) COLOR SEPARATION APPARATUS, COLOR SEPARATION METHOD, AND NON-TRANSITORY COMPUTER-READABLE MEDIUM

(71) Applicant: FUJIFILM Corporation, Tokyo (JP)

(72) Inventor: Shuhei Horita, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/466,728

(22) Filed: Aug. 22, 2014

(65) Prior Publication Data

US 2015/0062674 A1 Mar. 5, 2015

(30) Foreign Application Priority Data

Aug. 30, 2013 (JP) .................. 2013-180159

(51) Int. Cl.
*H04N 1/46* (2006.01)
*H04N 1/60* (2006.01)

(52) U.S. Cl.
CPC .................. *H04N 1/6027* (2013.01)

(58) Field of Classification Search
CPC ... H04N 1/40012; H04N 1/60; H04N 1/6016; H04N 2209/045; H04N 9/79; G03F 7/0007; G03F 7/027; G03F 7/105; G06F 3/011; G06F 11/08; G06F 19/321; G06F 3/017; G06F 3/1208; G06F 3/1256
See application file for complete search history.

(56) References Cited

U.S. PATENT DOCUMENTS

| | | | |
|---|---|---|---|
| 5,485,288 A * | 1/1996 | Kamei et al. | 358/530 |
| 5,649,971 A * | 7/1997 | Fain et al. | 607/72 |
| 5,898,821 A * | 4/1999 | Brandkamp | 358/3.06 |
| 6,180,324 B1 * | 1/2001 | Uehara | 430/353 |
| 6,480,299 B1 * | 11/2002 | Drakopoulos et al. | 358/1.9 |
| 7,164,494 B1 * | 1/2007 | Dalton | 358/1.9 |

(Continued)

FOREIGN PATENT DOCUMENTS

| | | |
|---|---|---|
| EP | 1 521 451 A2 | 4/2005 |
| JP | 2006-305757 A | 11/2006 |
| JP | 2007-116287 A | 5/2007 |

OTHER PUBLICATIONS

Chen, et al.: "Multi-Ink Color-Separation Algorithm Improving Image Quality", Journal of Imaging Science and Technology, vol. 52, No. 2, Mar. 1, 2008, pp. 020604-1-020604-7.

(Continued)

*Primary Examiner* — Negussie Worku
(74) *Attorney, Agent, or Firm* — McGinn IP Law Group, PLLC

(57) ABSTRACT

A color separation apparatus comprising: a target value acquisition device; a dot threshold data candidate selection device; a print profile acquisition device which acquires a print profile showing correspondence between device signal values and color system values in the printer for each of the candidates of dot threshold data; and a color separation device which allows the printer to calculate candidates of the device signal values on the basis of the target values of colors acquired by the target value acquisition device and the print profile, and determines dot threshold data for reproducing colors corresponding to the target values on the basis of the candidates of dot threshold data and the print profile from among the candidates of dot threshold data, as well as determines device signal values for reproducing colors corresponding to the target values from among the candidates of device signal values.

20 Claims, 19 Drawing Sheets

(56) References Cited

U.S. PATENT DOCUMENTS

| | | |
|---|---|---|
| 8,373,883 B2 * | 2/2013 | Hoarau et al. ............... 358/1.15 |
| 8,531,729 B2 * | 9/2013 | Seto ............................ 358/3.23 |
| 8,804,195 B2 * | 8/2014 | Nishikawa .................... 358/2.1 |
| 8,848,265 B2 * | 9/2014 | Matsumoto .................. 358/518 |
| 2004/0021886 A1 | 2/2004 | Boesten |
| 2007/0291312 A1 | 12/2007 | Kaneko et al. |
| 2011/0063632 A1 | 3/2011 | Klassen et al. |
| 2012/0086959 A1 | 4/2012 | Wu et al. |

OTHER PUBLICATIONS

Ja N Morovic, et al.: "Hans: Controlling Ink-Jet Print Attributes Via Neugebauer Primary Area Coverages", IEEE Transactions on Image Processing IEEE Service Center, Piscataway, NJ, US, vol. 21, No. 2, Feb. 1, 2012, pp. 688-696.

Extended European Search Report dated Feb. 10, 2015.

* cited by examiner

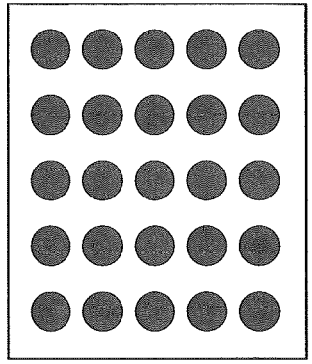
FIG.11C ACTUAL PRINTED MATTER → ON-PRINTED-MATTER DOT AREA RATE MEASUREMENT VALUE
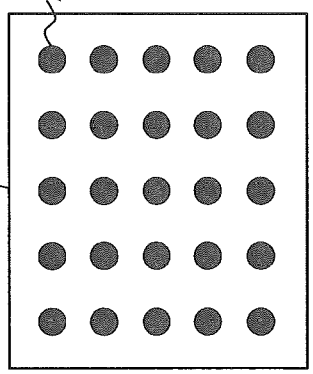
FIG.11B ACTUAL PLATE → ON-PLATE DOT AREA RATE MEASUREMENT VALUE
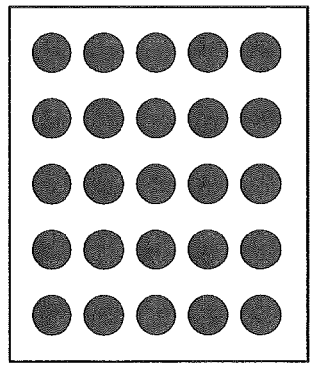
FIG.11A DOT IMAGE DATA FOR RESPONSE CHARACTERISTICS ACQUISITION

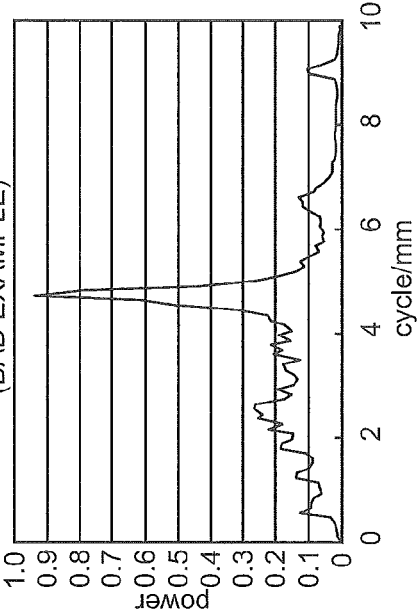
FIG.17B
EXAMPLE OF REMARKABLE ROSETTE PATTERN (BAD EXAMPLE)
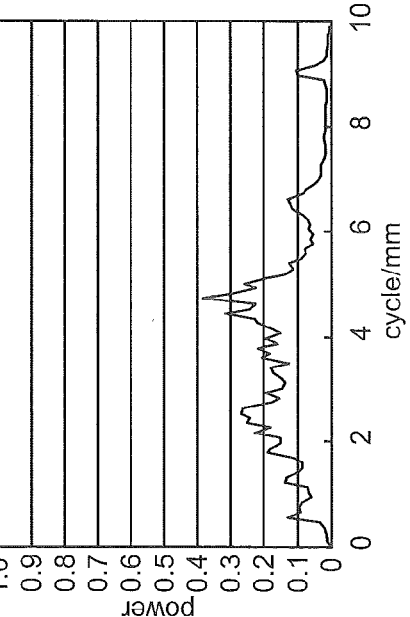
FIG.17D
EXAMPLE OF IMAGE QUALITY WITHOUT PROBLEMS (GOOD EXAMPLE)
FIG.17A
EXAMPLE OF REMARKABLE MOIRE (BAD EXAMPLE)
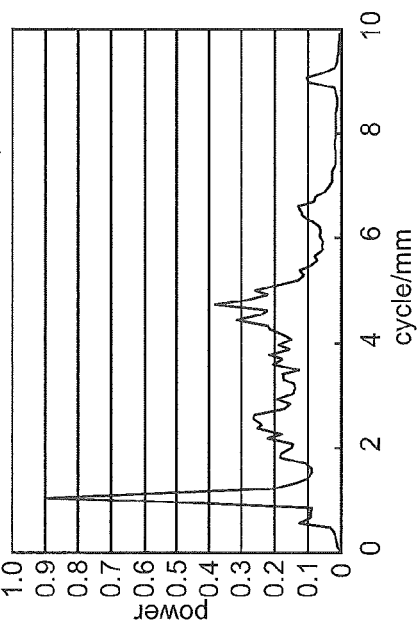
FIG.17C
EXAMPLE OF ANNOYING NOISE AND GRANULAR FEELING (BAD EXAMPLE)

FIG.19

| CMYK VALUE | COLOR DIFFERENCE | IMAGE QUALITY | COST | TARGET COLOR | REPRODUCTION COLOR | DETERMINATION |
|---|---|---|---|---|---|---|
| c1, m1, y1, k1 | A | C | B | | | |
| c2, m2, y2, k2 | B | B | C | | | |
| c3, m3, y3, k3 | C | A | B | | | |

US 9,055,264 B2

COLOR SEPARATION APPARATUS, COLOR SEPARATION METHOD, AND NON-TRANSITORY COMPUTER-READABLE MEDIUM

CROSS-REFERENCE TO RELATED APPLICATIONS

The patent application claims priority under 35 U.S.C. §119 to Japanese Patent Application No. 2013-180159, filed on Aug. 30, 2013. Each of the above application(s) is hereby expressly incorporated by reference, in its entirety, into the present application.

BACKGROUND OF THE INVENTION

1. Field of the Invention

The present invention relates to a color separation apparatus, a color separation method, and a color separation program, and more particularly to a color separation apparatus, a color separation method, and a color separation program, for applying color separation to image data for printing to make colors to be used in a printer.

2. Description of the Related Art

When image data is printed, color separation is applied to the image data to make a dot image for each of color materials (process colors (CMYK), for example), and overprinting is performed by using a printing plate on which dots corresponding to each of the color materials are formed so that gradation of the image data is expressed. In a case where dot images corresponding to a plurality of color materials are overprinted, a pattern with an image formation such as a moire and a rosette pattern sometimes occurs depending on a position and an angle of a dot, screen ruling, and a shape.

Japanese Patent Application Laid-Open No. 2007-116287 (patent literature 1) discloses a method of evaluating noise information having strong periodicity in dot images when color separation is applied to image data. In Japanese Patent Application Laid-Open No. 2007-116287, a printed patch image is read, and each pixel data of the image data is resolved into RGB data to be transferred to an optimization unit 12 by being converted into color information (L*, a*, and b*, for example) in a uniform color space. The optimization unit 12 calculates a graininess evaluation value on the basis of L* based on parameter of granularity and ink concentration determined by a UI unit 11 (refer to the paragraphs [0019] to [0023]).

SUMMARY OF THE INVENTION

According to Japanese Patent Application Laid-Open No. 2007-116287, when color separation is performed, patches corresponding to all combinations of device signal values (256 colors per one color) are printed so that color information is obtained from an image of the patch, whereby an evaluation value of granularity is calculated. Thus, when color separation into two colors is performed, it is necessary to print a large number of patches of 256×256 (=65536) for measurement of the patches. Accordingly, when color separation into four colors of CMYK is performed, it takes time because an enormous number of patches are printed for measurement of the patches. Further, since an evaluation value such as granularity varies depending on a type of a dot, operation of printing and measurement is required for each type of a dot to cause a large load of the operation.

The present invention is made in light of the above-mentioned circumstances, and an object of the present invention is to provide a color separation apparatus, a color separation method, and a color separation program, capable of easily performing color separation for preventing an image formation such as a moire and a rosette pattern from occurring.

In order to solve the problem described above, a color separation apparatus according to a first aspect of the present invention includes: a target value acquisition device which acquires target values of colors to be reproduced in a printer from continuous-tone image data when the printer creates binary image data showing shape and arrangement of dots constituting an image for each of color materials; a dot threshold data candidate selection device which acquires candidates of dot threshold data including information on a threshold for each of the dots for converting the continuous-tone image data into binary image data for each of the color materials; a print profile acquisition device which acquires a print profile showing correspondence between device signal values and color system values in the printer for each of the candidates of dot threshold data; and a color separation device which allows the printer to calculate candidates of the device signal values on the basis of the target values of colors acquired by the target value acquisition device and the print profile, and determines dot threshold data for reproducing colors corresponding to the target values on the basis of the candidates of dot threshold data and the print profile from among the candidates of dot threshold data, as well as determines device signal values for reproducing colors corresponding to the target values from among the candidates of device signal values.

According to the present aspect, it is possible to select optimum dot threshold data capable of preventing a color difference and preventing an image formation from occurring by a simpler calculation without printing and measuring a patch for each device signal value, thereby enabling optimum color separation to be achieved.

A color separation apparatus according to a second aspect of the present invention is the color separation apparatus according to the first aspect, further including a color evaluation value holding device which holds a color evaluation value showing a color difference between a device signal value and a color corresponding to a target value for each of the candidates of the device signal values; and an image quality evaluation value calculation device which calculates an image quality evaluation value for each of the candidates of the device signal values on the basis of the candidates of the dot threshold data and the print profile, and in the second aspect the color separation device is configured to determine dot threshold data and device signal values for reproducing colors corresponding to target values on the basis of the color evaluation value and the image quality evaluation value.

A color separation apparatus according to a third aspect of the present invention is the color separation apparatus according to the second aspect, further including a simulation device which applies binary coded processing to the candidates of the device signal values by using the dot threshold data to create binary image data for each of color materials for each of the candidates, and simulates an image formed by the printer on a printed matter by superimposing binary image data for each of the color materials, and in the third aspect, the image quality evaluation value calculation device is configured to calculate the image quality evaluation value for each of the candidates on the basis of a result of the simulation of the image to be formed on the printed matter.

A color separation apparatus according to a fourth aspect of the present invention is the color separation apparatus according to the third aspect, in which the simulation device creates the binary image data in consideration of change in a shape of the dot occurring when the dot is printed by the printer on the basis of response characteristics at the time of forming dots corresponding to the binary image data in the printer.

A color separation apparatus according to a fifth aspect of the present invention is the color separation apparatus according to one of the second to fourth aspects, further including an ink cost evaluation value calculation device which calculates an ink cost evaluation value for each of the candidates of the device signal values on the basis of a dot area rate of each of color materials, and in the fifth aspect, the color separation device is configured to determine the dot threshold data and the device signal values for reproducing colors corresponding to target values on the basis of a color evaluation value, an image quality evaluation value, and an ink cost evaluation value.

A color separation apparatus according to a sixth aspect of the present invention is the color separation apparatus according to one of the second to fourth aspects, further including a weight coefficient setting device which determines a weight coefficient for each of evaluation values; and a total evaluation value calculation device which calculates a total evaluation value for each of the candidates of the device signal values by performing weighting addition of each of the evaluation values by using the weight coefficient determined by the weight coefficient setting device, and in the sixth aspect, the color separation device is configured to determine dot threshold data and device signal values for reproducing colors corresponding to target values on the basis of the total evaluation value.

A color separation apparatus according to a seventh aspect of the present invention is the color separation apparatus according to one of the first to sixth aspects, in which the target value acquisition device acquires target values of colors to be reproduced in a printer by receiving input of an identifier for identifying a color or by measuring the colors.

An eighth aspect of the present invention is a color separation method performed by a color separation apparatus and includes: a target value acquisition step of acquiring target values of colors to be reproduced in a printer from continuous-tone image data when the printer creates binary image data showing shape and arrangement of dots constituting an image for each of color materials; a dot threshold data candidate selection step of acquiring candidates of dot threshold data including information on a threshold for each of the dots, for converting the continuous-tone image data into binary image data for each of the color materials; a print profile acquisition step of acquiring a print profile showing correspondence between a device signal value and a color system value in the printer for each of the candidates of the dot threshold data; and a color separation step of allowing the printer to calculate candidates of the device signal values on the basis of the target values of colors acquired in the target value acquisition step and the print profile, and determining dot threshold data for reproducing colors corresponding to the target values on the basis of the candidates of the dot threshold data and the print profile from among the candidates of the dot threshold data, as well as determining device signal values for reproducing colors corresponding to the target values from among the candidates of the device signal values.

A non-transitory computer-readable medium storing a color separation program according to a ninth aspect of the present invention allowing a computer to realize the functions of: a target value acquisition of acquiring target values of colors to be reproduced in a printer from continuous-tone image data when the printer creates binary image data showing shape and arrangement of dots constituting an image for each of color materials; a dot threshold data candidate selection of acquiring candidates of dot threshold data including information on a threshold for each of the dots, for converting the continuous-tone image data into binary image data for each of the color materials; a print profile acquisition of acquiring a print profile showing correspondence between a device signal value and a color system value in the printer for each of the candidates of the dot threshold data; and a color separation of allowing the printer to calculate candidates of the device signal values on the basis of the target values of colors acquired by the target value acquisition and the print profile, and determining dot threshold data for reproducing colors corresponding to the target values on the basis of the candidates of the dot threshold data and the print profile from among the candidates of the dot threshold data, as well as determining device signal values for reproducing colors corresponding to the target values from among the candidates of the device signal values.

According to the present invention, since color separation is performed by using an image quality evaluation value calculated by using a power spectrum of a dot overlapping solid brightness image and a power spectrum of visual characteristics in addition to a color difference evaluation value showing an amplitude of a color difference, it is possible to prevent an image formation such as a moire and a rosette pattern from occurring while a color difference occurring between a spot color and a color system is prevented. Further, by performing dot overlapping simulation, it is possible to select optimum dot threshold data capable of preventing a color difference and preventing an image formation from occurring by a simpler calculation without printing and measuring a patch for each device signal value, thereby enabling optimum color separation to be achieved.

BRIEF DESCRIPTION OF THE DRAWINGS

FIG. 11A is a plan view showing dot image data for acquiring response characteristics, FIG. 11B is a plan view showing dot shapes on a printing plate (actual plate), and FIG. 11C is a plan view showing dot shapes on a printed matter (actual printed matter);

FIGS. 17A to 17D are graphs showing examples of a power spectrum of a dot overlapping solid brightness image;

FIG. 19 is a diagram showing a GUI to select a color separation result.

DETAILED DESCRIPTION OF THE PREFERRED EMBODIMENTS

Referring to accompanying drawings, embodiments of the color separation apparatus, the color separation method, and the color separation program, in accordance with the present invention, will be described below.

A configuration of an image formation system will be described below.

Figure 1:
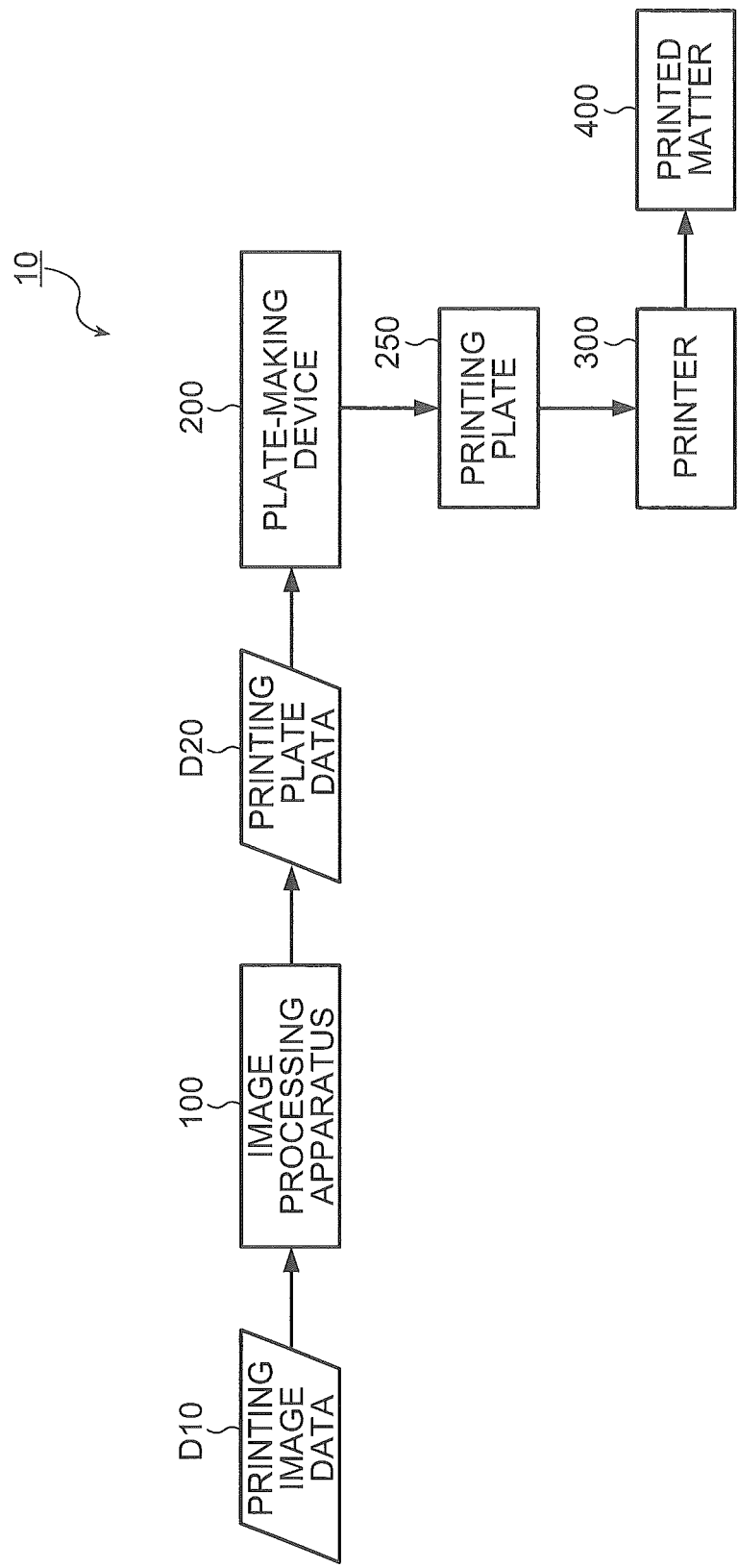
FIG. 1 is a block diagram showing a configuration of an image formation system in accordance with one embodiment of the present invention.

FIG. 1 is a block diagram showing a configuration of an image formation system in accordance with one embodiment of the present invention.

As shown in FIG. 1, an image formation system 10 in accordance with the present embodiment includes an image processing apparatus 100, plate-making device 200, and a printer 300.

Printing image data D10 includes a continuous-tone image signal. The image processing apparatus 100 applies color separation processing to the printing image data D10 received to create plate-making data D20 showing a dot image for each of color materials (in the present embodiment, four colors of cyan (C), magenta (M), yellow (Y), and black (K)) used in the printer 300, and outputs the plate-making data D20 to the plate-making device 200.

The plate-making device 200 serves as a Computer To Plate (CTP) drawing device which creates a printing plate 250 provided with protrusions corresponding to a plurality of dots on the basis of the plate-making data D20 supplied from the image processing apparatus 100. The plate-making device 200 is provided with a laser engraving machine, and creates the printing plate 250 by engraving the protrusions corresponding to a plurality of dots on a principal surface of the printing plate 250. In a case of flexographic printing, a high elastic material such as a rubber sheet and a photocurable resin sheet is used as a material of the printing plate 250, for example.

The printer 300 applies a color material (ink) to the printing plate 250 created by the plate-making device 200 and allows the ink to transfer to a printing surface of a recording medium (recording paper) to form a printed matter 400. In a case of the flexographic printing, a printing medium with rough surface (such as corrugated cardboard, film, and cloth) is used as the recording paper in addition to sheet paper and roll paper for printing. The printer 300 as well as the plate-making device 200 constitutes an image forming apparatus which forms an image on a printing surface of recording paper.

A configuration of an image processing apparatus will be described below.

Figure 2:
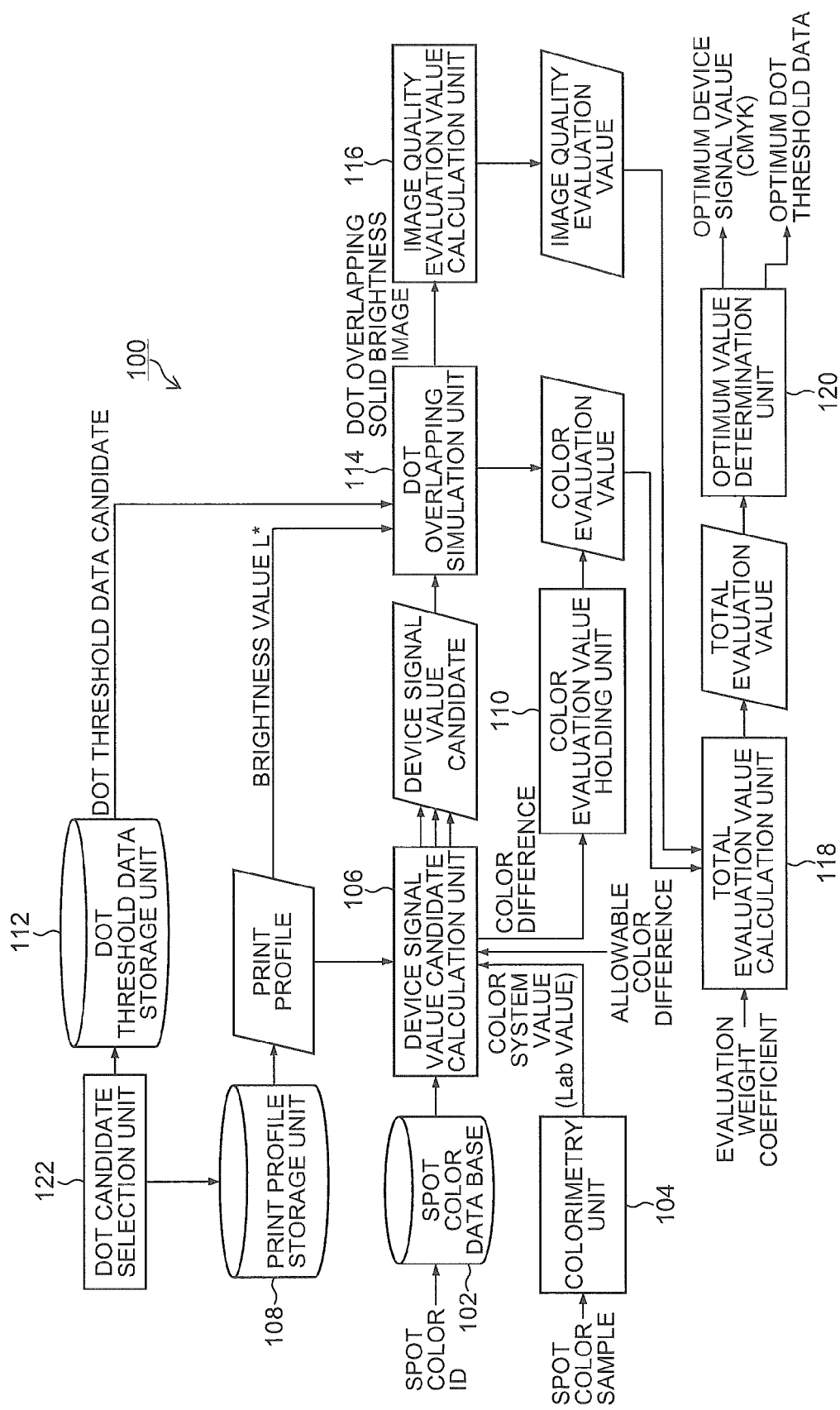
FIG. 2 is a block diagram showing a configuration of an image processing apparatus in accordance with one embodiment of the present invention.

FIG. 2 is a block diagram showing a configuration of an image processing apparatus (color separation apparatus) in accordance with one embodiment of the present invention.

The image processing apparatus 100 shown in FIG. 2 acquires target values of colors to be reproduced in the printer 300. In addition, the image processing apparatus 100 performs color separation processing to acquire an optimum device signal value and optimum dot threshold data on the basis of the acquired target values of colors above and a print profile in the printer 300.

FIG. 2 shows the following: a spot color data base (DB) 102 and a colorimetry unit 104, which constitute a target value acquisition device; a dot candidate selection unit 122 which constitutes a dot threshold data candidate selection device; a device signal value candidate calculation unit 106 and a print profile storage unit 108, which constitute a print profile acquisition device; and the device signal value candidate calculation unit 106, a color evaluation value holding unit 110, a dot overlapping simulation unit 114, an image quality evaluation value calculation unit 116, a total evaluation value calculation unit 118, and an optimal values determination unit 120, which constitute a color separation device.

In the present embodiment, an example, in which the L* a* b* color system (established by Japanese Industrial Standards Committee (JIS) Z 8729) is used as a color system showing target values of colors and a color system in a print profile, is described, however, a color system of the present invention is not limited to the color system above. It is possible to use the following: the XYZ color system (a stimulus value Y including luminance (brightness), and stimulus values of color X and Z) established by Commission International e de l'Eclairage (CIE); the Yxy color system (luminance Y, and chromaticity coordinates x and y); the L* u* v* color system (established by JIS Z 8518); as well as the HSV color system (hue H (hue), saturation S (saturation), and brightness V (value) or B (brightness)); the HLS color system (hue H (hue), saturation S (saturation), luminance L (luminance)); and the YCbCr color system (luminance Y, color differences Cb and Cr), for example.

Acquisition of spot colors will be described below.

The spot color data base (spot color DB) 102 stores a look-up table (LUT) showing correspondence between a number (identifier and spot color ID) of a spot color in a color sample book of an ink manufacturer, such as PANTONE, DIC, and TOYO, and color system values (in the present embodiment, Lab values (brightness value L*, chromaticity values a* and b*)) corresponding to a spot color ID. The image processing apparatus 100 receives input of a spot color ID to identify a color to be a target, which is to be reproduced on the printed matter 400, from a user, and acquires color system values (Lab values) corresponding to the received spot color ID from the spot color DB 102.

The colorimetry unit 104 is provided with a colorimetry machine (an optical colorimetry machine such as a spectrophotometric colorimeter, for example). The colorimetry unit 104 measures color system values (Lab values) corresponding to a spot color sample (a color chip and a printed matter, for example) to which a spot color to identify the target color to be reproduced on the printed matter 400 is applied, or a color of an object whose color can be measured (an object to be a color sample) by using a colorimetry machine.

An Lab value of the spot color identified by the spot color ID described above, or an Lab value (a target value showing the target color to be reproduced on the printed matter 400) of the spot color measured by the colorimetry machine is outputted to the device signal value candidate calculation unit 106.

In the present embodiment, an example, in which color separation into four colors of CMYK is applied, is described, however, the number of and a type of the color materials in the printer 300 are not limited to the four colors above. The color separation method in accordance with the present invention is also applicable to a case of three color materials (CMY, for example), for example. In addition, the color separation method in accordance with the present invention is also applicable to a case of color materials of five or more, such as: five colors of CMYK+one additional spot color (a color specified by a user, or a color selected by the image processing apparatus 100 on the basis of hue of a color specified by a user, for example); six colors of CMYK+additional two spot colors ("orange (O) and green (G)", or "orange (O) and violet (V)", for example); and seven colors of CMYK+additional three spot colors (for example, "red (R), green (G), and blue (B)", or "O, G, and V").

Selection of a candidate of dot threshold data will be described below.

The dot threshold data storage unit 112 stores a plurality of pieces of dot threshold data (AM dots (Amplitude Modulation Screening)/FM dots (Frequency Modulation Screening)) to binarize continuous-tone image data for each of color materials.

Figure 3:
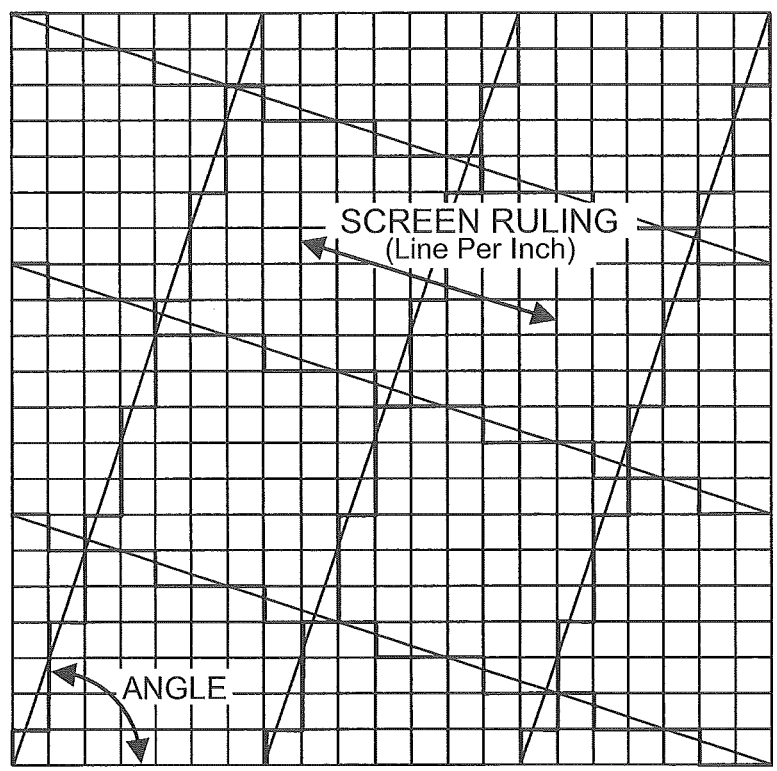
FIG. 3 is a diagram to explain a parameter for specifying a type of dot threshold data (AM dots)
Figure 4A:
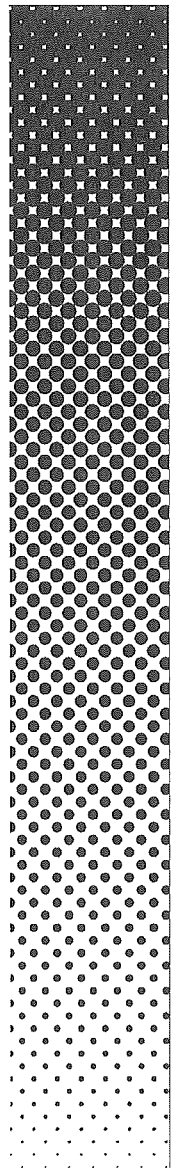
FIGS. 4A to 4C are diagrams showing a type of a dot shape of dot threshold data (AM dots)
Figure 4B:
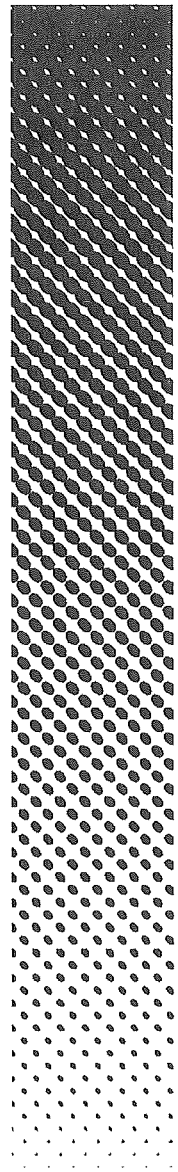
Figure 4C:
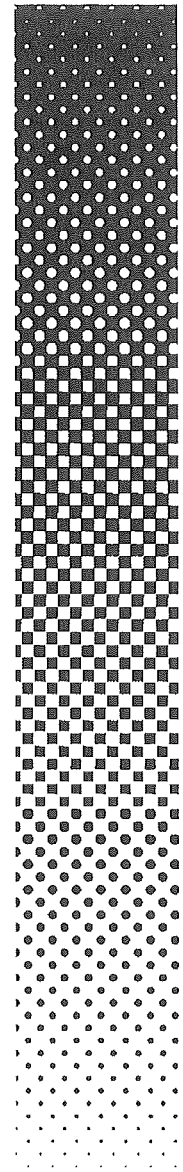

FIG. 3 is a diagram to explain a parameter for specifying a type of dot threshold data (AM dots), and FIGS. 4A to 4C are diagrams showing a type of a dot shape of dot threshold data (AM dots).

In FIG. 3, screen ruling serves as a parameter showing dot density per unit length, and a screen angle serves as an angle made by a dot array direction, and a vertical axis or a horizontal axis.

The dot threshold data storage unit 112 stores dot threshold data (AM dots) of screen ruling of 100, 120, 133, 150, 175, 200, 250, and 300 lpi (line per inch), as an example, and a dot shape of circle (Circular; FIG. 4A), ellipse (Elliptical; FIG. 4B), square (Square), and circle-square (Round-Square; FIG. 4C).

In addition, dot threshold data (FM dots) with a dot diameter of 20, 25, and 30 μm, as an example, is stored.

The dot candidate selection unit 122 selects a plurality of types of candidates of dot threshold data that a user uses from among the dot threshold data stored in the dot threshold data storage unit 112. All types of dot threshold data may be selected as candidates.

Calculation of a device signal value candidate and a color evaluation value will be described below.

The print profile storage unit 108 stores a look-up table (LUT; a print profile to convert device signal values into color system values (Lab values)) showing correspondence between device signal values corresponding to color materials (process colors (CMYK), for example) and color system values (in the present embodiment, Lab values). It is possible to use an A2B1 table of a profile of the International Color Consortium (ICC) as the print profile, for example. There are an A2B0 table (Perceptual (perceptual coincidence)) and an A2B2 table (Saturation (saturation is emphasized)) serving as a method of color space conversion other than the A2B1 table (Relative Colormetric (colorimetry coincidence)). If the A2B1 table is adopted, a relative color gamut is maintained, therefore, it is possible to minimize influence of color gamut conversion (compression).

The device signal value candidate calculation unit 106 acquires a print profile for converting device signal values corresponding to color materials (process colors (CMYK), for example) into color system values (Lab values) for each of candidates of the dot threshold data above from the print profile storage unit 108. In addition, the device signal value candidate calculation unit 106 performs inverse operation by using the print profile to calculate candidates ((c1, m1, y1, k1), (c2, m2, y2, k2), (c3, m3, y3, k3), . . . ) of device signal values (CMYK values in the printer 300), which enable target Lab values (target Lab values), which is to be reproduced on recording paper, to be reproduced within a range of an allowable color difference, for each of candidates of dot threshold data.

Specifically, the device signal value candidate calculation unit 106 searches for CMYK values satisfying conditions of Expression 1 below, where an allowable color difference is indicated as dEa, target Lab values is indicated as (Lt, at, bt), and output values (Lab values) when (C, M, Y, K) is inputted into a print profile (LUT) are indicated as (Lp, ap, bp)=LUT (C, M, Y, K), to acquire candidates of the CMYK values.

$$dE(C,M,Y,K)=\sqrt{(Lt-Lp)^2+(at-ap)^2+(bt-bp)^2}\leq dEa \quad \text{[Expression 1]}$$

In Expression 1, a user may specify a value of the allowable color difference dEa in consideration of color reproducibility and the like in the printer 300. In addition, the value of the allowable color difference dEa may be predetermined (3, for example).

It is possible to adopt the Newton method and the like as the method of searching for candidates of CMYK values. In the search for the candidates of the CMYK values, it is allowed to search for all CMYK values satisfying the conditions of Expression 1.

In addition, at the time of calculating candidates of device signal values, an allowable color difference may not be used. In this case, a total number (N) of candidates of device signal values is predetermined so that N candidates in ascending order of a color difference dE in a search range may be selected, for example.

Each of the candidates of dot threshold data and the color difference dE corresponding to each of the candidates of the CMYK values, which are acquired as the result of the search, are outputted from the device signal value candidate calculation unit 106 to the color evaluation value holding unit (color evaluation value holding device) 110. The color evaluation value holding unit 110 holds the color difference dE as a color evaluation value (E) corresponding to each of the candidates of dot threshold data and each of the candidates of the CMYK values.

Expression 1 above serves as a calculation expression of a color difference $\Delta E^*ab$ in an $L^* a^* b^*$ color system, however, another calculation expression of a color difference (the calculation expression of a color difference $\Delta E00$ in the Commission International d'Eclairage 2000 (CIE DE 2000), for example) may be used. In addition, a type of a calculation expression of a color difference to be used in search for candidates of the CMYK values can be specified by a user.

In addition, even in a case where a color system other than the $L^* a^* b^*$ color system is used, it is possible to calculate a color difference by a method similar to the method described above.

Dot overlapping simulation processing will be described below.

The dot overlapping simulation unit (simulation device) 114 estimates (simulates) an image to be formed when binary image data corresponding to each of color materials (CMYK) is printed. Specifically, the dot overlapping simulation unit 114 creates simple tint dot image data (simple dot image data and binary image data) for each of the candidates of dot threshold data pieces and for each of the color materials (CMYK), from each of the candidates of the device signal values calculated by the device signal value candidate calculation unit 106 by using the candidates of dot threshold data described above.

Figure 5:
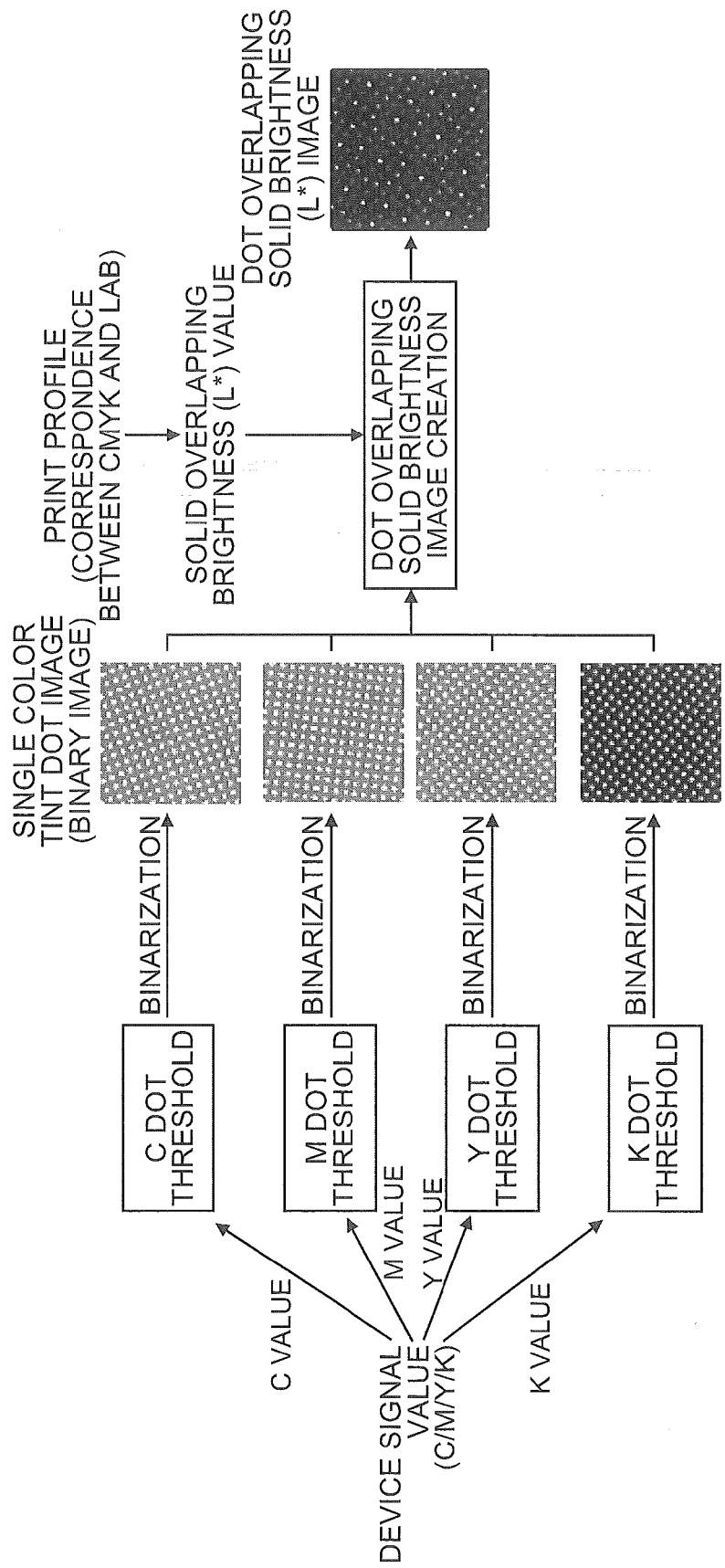
FIG. 5 is a diagram to explain basic processing of dot overlapping simulation.
Figure 6:
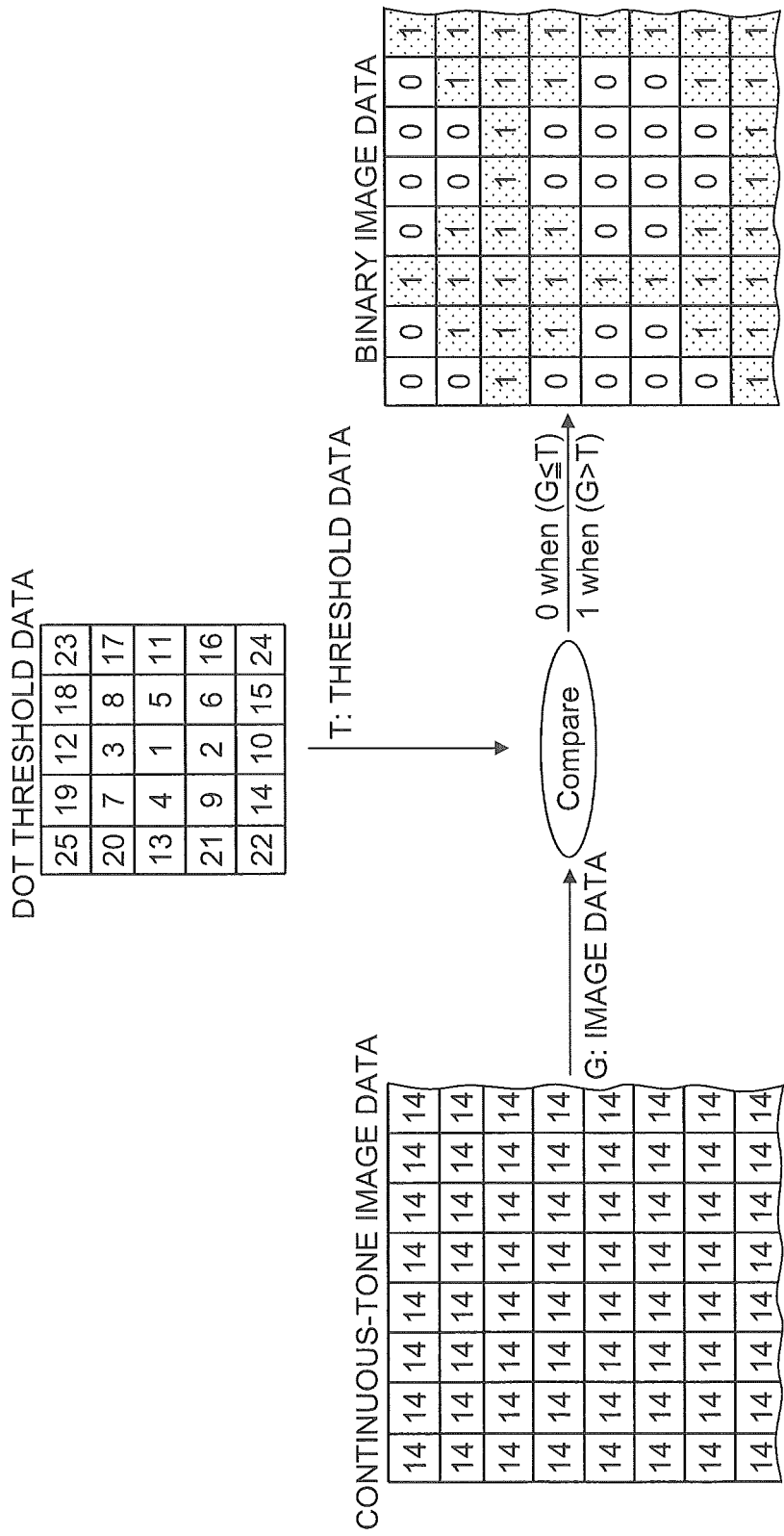
FIG. 6 is a diagram to explain processing of creating a dot image with a single color from candidates of device signal values (CMYK)

FIG. 5 is a diagram to explain basic processing of dot overlapping simulation. FIG. 6 is a diagram to explain processing of creating a dot image with a single color from candidates of device signal values (CMYK).

First, the dot overlapping simulation unit 114 acquires dot threshold data corresponding to each of color materials (process colors (CMYK)) from the dot threshold data storage unit 112. As shown in FIG. 5, then the dot overlapping simulation unit 114 applies raster conversion to the candidates of the device signal values (continuous-tone image data of color materials (CMYK)) calculated by the device signal value candidate calculation unit 106 to acquire raster data corresponding to the candidates of the device signal values. The dot overlapping simulation unit 114 then compares the raster data acquired from the candidates of the device signal values and the dot threshold data to create tint dot image data (dot image data and binary image data) for each of the color materials (CMYK).

Specifically, as shown in FIG. 6, in a case where a pixel value (G) of the device signals calculated by the device signal value candidate calculation unit 106 is more than a value (T) of a corresponding pixel of the dot threshold data (G>T), the dot overlapping simulation unit 114 indicates the value of the pixel in binary image data as "1". On the other hand, in a case where a pixel value of the device signals is equal to or less than a value of a corresponding pixel of the dot threshold data (G≤T), the dot overlapping simulation unit 114 indicates the value of the pixel in binary image data as "0".

Next, as shown in FIG. 5, the dot overlapping simulation unit 114 creates a dot overlapping solid brightness image including information on a brightness value (L*) of each of pixels by superimposing a binary image for each of the color materials (CMYK).

The dot overlapping solid brightness image serves as an image with sixteen brightness values (L* values) corresponding to the number of combinations of values (binary of a dot area rate of 0% or 100%) of the CMYK superimposed with each other. It is possible to acquire brightness values (L* values) with respect to sixteen of the number of the combination of the CMYK from a print profile. The dot overlapping solid brightness image created as above is outputted to the image quality evaluation value calculation unit 116.

Table 1 shows an example of brightness values (L* values) acquired from a print profile. The brightness values (L* values) in Table 1 may vary depending on a type of the printer 300.

TABLE 1

| Solid | C (%) | M (%) | Y (%) | K (%) | L* value |
|---|---|---|---|---|---|
| W (Paper White) | 0 | 0 | 0 | 0 | 100.0 |
| C | 100 | 0 | 0 | 0 | 56.5 |
| M | 0 | 100 | 0 | 0 | 49.3 |
| Y | 0 | 0 | 100 | 0 | 93.9 |
| K | 0 | 0 | 0 | 100 | 12.8 |
| CM | 100 | 100 | 0 | 0 | 18.4 |
| CY | 100 | 0 | 100 | 0 | 49.7 |
| CK | 100 | 0 | 0 | 100 | 7.7 |
| MY | 0 | 100 | 100 | 0 | 47.8 |
| MK | 0 | 100 | 0 | 100 | 7.6 |
| YK | 0 | 0 | 100 | 100 | 13.2 |
| CMY | 100 | 100 | 100 | 0 | 14.9 |
| CMK | 100 | 100 | 0 | 100 | 4.9 |
| CYK | 100 | 0 | 100 | 100 | 7.4 |
| MYK | 0 | 100 | 100 | 100 | 7.8 |
| CMYK | 100 | 100 | 100 | 100 | 5.0 |

In the present embodiment, dot overlapping simulation is performed by using a brightness value L* of an L* a* b* color system, however, the present invention is not limited to the brightness value. In a case where the XYZ color system, the Yxy color system, the YCbCr color system, or the HLS color system, is used, for example, the dot overlapping simulation may be performed by using a luminance image showing distribution of luminance values (Y or L).

In addition, the dot overlapping simulation may be performed by using an image showing distribution of a component (chromaticity (chromaticity values a* and b* of the L* a* b* color system) or saturation (saturation S of the HSV color system and the HLS color system), for example) other than brightness values or luminance values. In this case, it is possible to evaluate a noise and an image formation caused by a color tone.

Further, the dot overlapping simulation may be performed by using brightness values or luminance values, as well as a component other than them. In this case, it is possible to evaluate not only a noise and an image formation (a moire and a rosette pattern, for example) caused by brightness but also a noise and an image formation caused by a color tone.

Dot overlapping simulation processing including processing of estimating change in a dot shape will be described below.

In a case where dot overlapping simulation is performed by assuming a printing system (off-set printing, etc.) with a relatively small difference between dots in device signal value data and dots on the printed matter 400, it is sufficient to perform basic processing shown in FIG. 5. On the other hand, in a case where dot overlapping simulation is performed by assuming a printing system (flexographic printing, etc.) with a relatively large difference between dots in device signal value data and dots on the printed matter 400, it is preferable that processing of estimating change in a dot shape (dot spreading simulation) is added to steps before a single color tint dot image (single color dot image) is acquired in the basic processing, as shown in FIG. 7.

Figure 7:
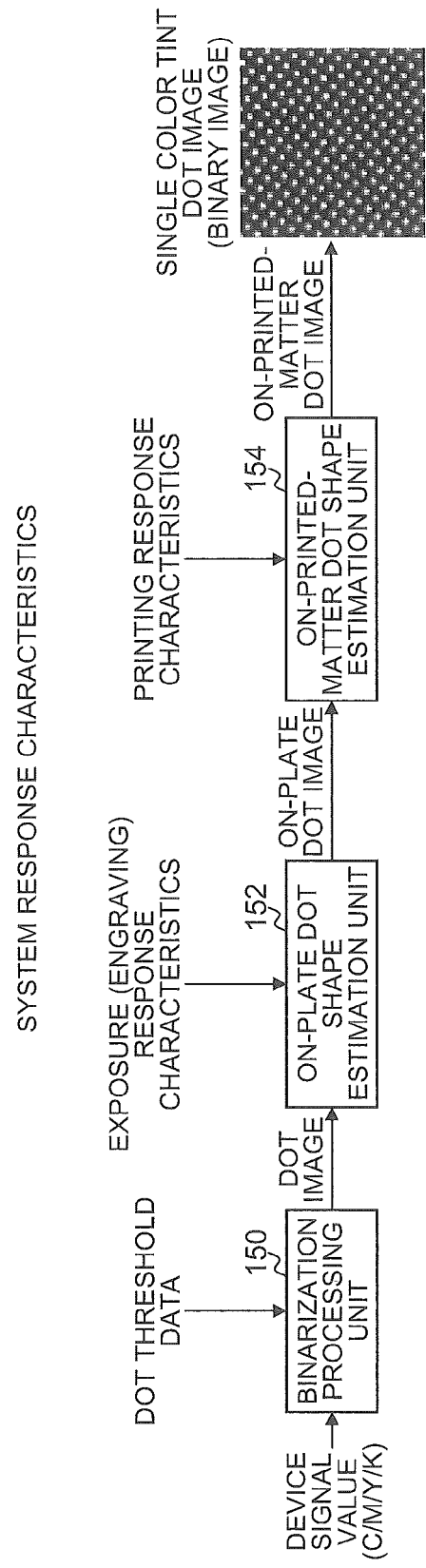
FIG. 7 is a block diagram showing a configuration of a dot overlapping simulation processing unit when processing of estimating a dot shape change is performed.

FIG. 7 is a block diagram showing a configuration of a dot overlapping simulation processing unit when processing of estimating dot shape change is performed.

In an example shown in FIG. 7, the dot overlapping simulation unit 114 includes a binarization processing unit 150, an on-plate dot shape estimation unit 152, and an on-printed-matter dot shape estimation unit 154. In addition, in the example shown in FIG. 7, two steps of on-plate dot shape estimation processing and on-printed-matter dot shape estimation processing are performed between processing of the binarization processing unit 150 and creation processing of single color tint dot image data (single color dot image).

System response characteristics data can vary depending on a configuration of the image formation system 10, and stored in a memory of the dot overlapping simulation unit 114, for example. The system response characteristics data includes exposure (engraving) response characteristics data and printing response characteristics data (transfer response characteristics data).

The exposure response characteristics data shows optical characteristics of a laser engraving machine provided in the plate-making device 200, and is defined as a Point Spread Function (PSF) showing an engravable range (a position and a size) on the printing plate 250 when protrusions corresponding to dots are engraved (exposed) on the printing plate 250.

The printing response characteristics data shows transfer characteristics when ink is transferred to recording paper in the printer 300, and is defined as a PSF showing a range (a position and a size) of points to be reproduced on the printed matter 400 when dots are printed by using the protrusions formed on the printing plate 250.

The on-plate dot shape estimation unit 152 estimates a difference between a dot shape in data and a dot shape to be formed on the printing plate 250 when dots are formed on the printing plate 250 by the plate-making device 200 on the basis of exposure (engraving) response characteristics data.

The on-printed-matter dot shape estimation unit 154 estimates a difference between a shape of a dot formed on the printing plate 250 by the plate-making device 200 and a shape of a dot to be formed on the printed matter 400 by using the printing plate 250 on the basis of the printing response characteristics data (transfer response characteristics data).

As shown in FIG. 7, the system response characteristics data serves as data showing change in a dot shape occurring in steps until an image is created on recording paper after a binary image signal is created by the binarization processing unit 150. The system response characteristics data varies depending on a configuration of the image formation system 10.

Figure 8:
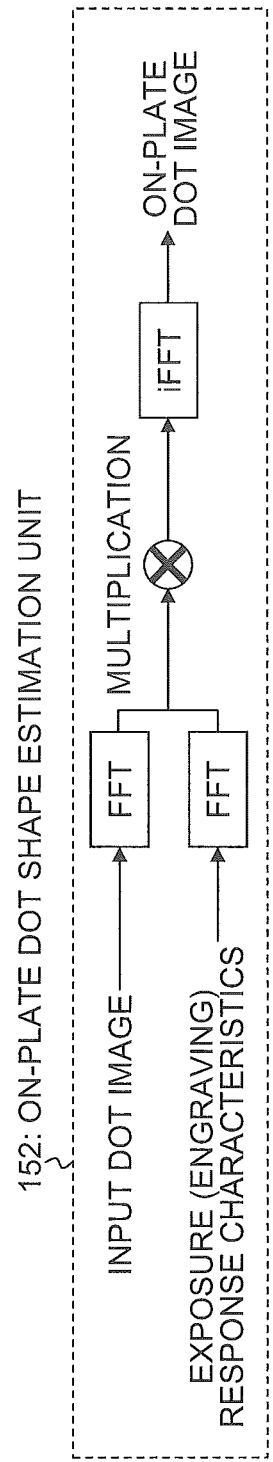
FIG. 8 is a block diagram showing a configuration of an on-plate dot shape estimation processing unit.
Figure 9:
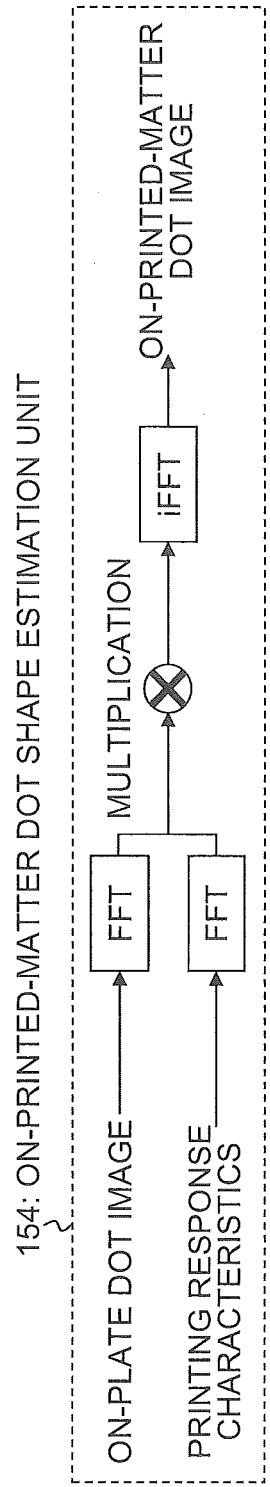
FIG. 9 is a block diagram showing a configuration of an on-printed-matter dot shape estimation processing unit.

FIG. 8 is a block diagram showing a configuration of the on-plate dot shape estimation unit 152, and FIG. 9 is a block diagram showing a configuration of an on-printed-matter dot shape estimation unit 154.

The on-plate dot shape estimation unit 152, as shown in FIG. 8, applies FFT processing to each of the dot image data received from the binarization processing unit 150 and the exposure response characteristics data to perform multiplication of them. The on-plate dot shape estimation unit 152 then applies high speed Fourier inverse transformation (iFFT) processing to the data acquired by the multiplication to create on-plate dot image data showing arrangement and shapes of dots on the printing plate 250, and outputs the data to the on-printed-matter dot shape estimation unit 154.

The on-printed-matter dot shape estimation unit 154, as shown in FIG. 9, applies FFT processing to each of the on-plate dot image data received from the on-plate dot shape estimation unit 152 and the printing response characteristics data to perform multiplication of them. The on-printed-matter dot shape estimation unit 154 then applies high speed Fourier inverse transformation (iFFT) processing to the data acquired by the multiplication to create on-printed-matter dot image data showing arrangement and shapes of dots on the printed matter 400.

The dot overlapping simulation unit 114 creates tint dot image data (dot image data and binary image) for each colors of CMYK on the basis of the on-printed-matter dot image data.

In the example shown in FIG. 8 and FIG. 9, dot shape estimation processing is performed by multiplication in a Fourier space, however, the dot shape estimation processing may be performed by convolution operation in a real space.

Estimation processing of system response characteristics will be described below.

If system response characteristics data is not provided in advance, the system response characteristics can be estimated as described below.

Figure 10:
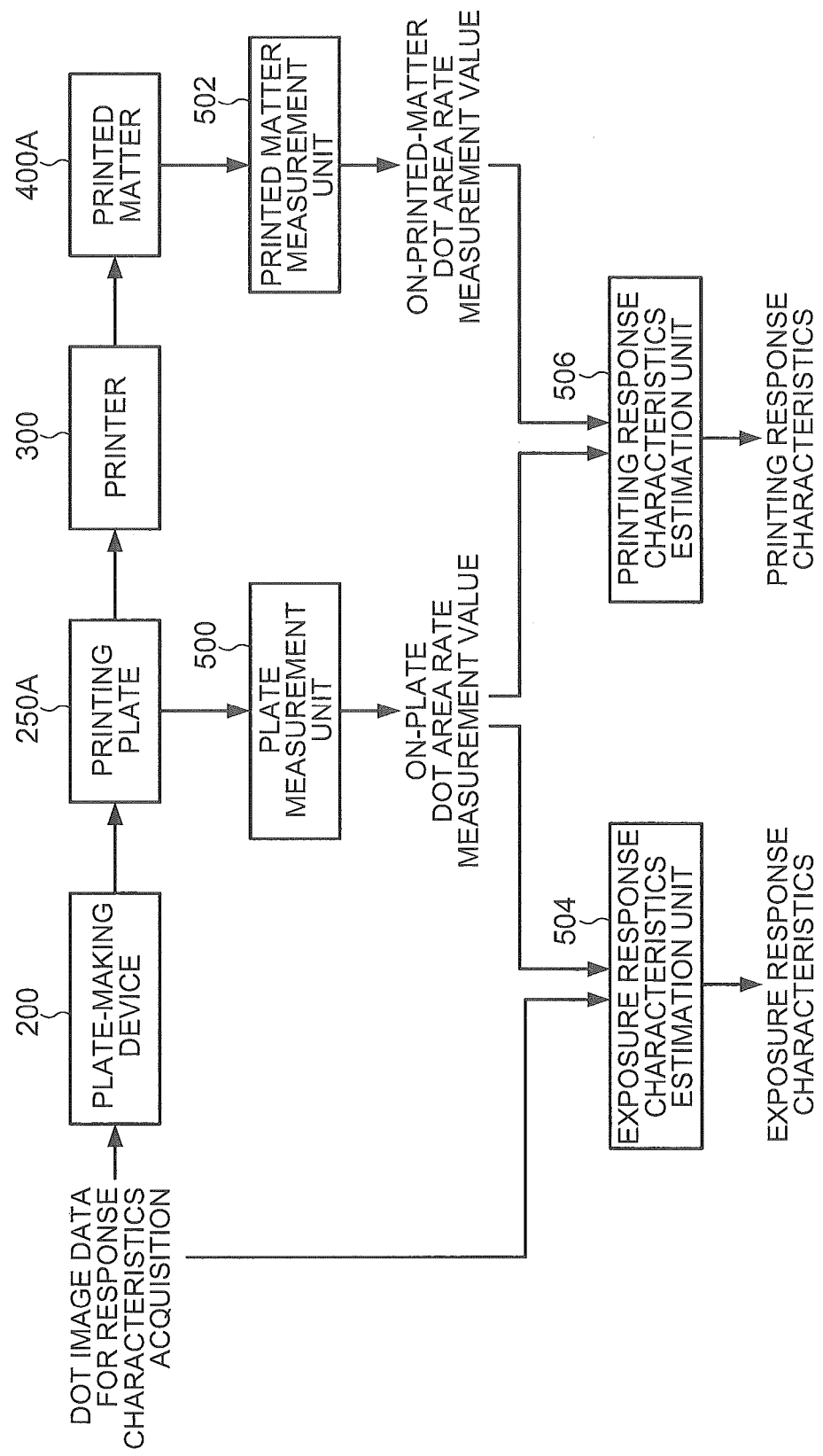
FIG. 10 is a block diagram to explain processing of estimating system response characteristics.

FIG. 10 is a block diagram to explain processing of estimating system response characteristics, and FIGS. 11A, 11B, and 11C, are plan views showing dot image data for response characteristics acquisition, dot shapes on a printing plate (real plate), and dot shapes on a printed matter (real printed matter), respectively.

As shown in FIG. 10, an estimation system of system response characteristics in accordance with the present embodiment includes: a plate measurement unit 500; a printed matter measurement unit 502; an exposure response characteristics estimation unit 504; and a printing response characteristics estimation unit 506. A measurement value of an on-plate dot area rate measured by the plate measurement unit 500 and a measurement value of an on-printed-matter dot area rate measured by the printed matter measurement unit 502 can be inputted into the exposure response characteristics estimation unit 504 and the printing response characteristics estimation unit 506, respectively, through a predetermined communication device or an input device.

In an example of FIG. 10, the plate-making device 200 receives input of the dot image data for response characteristics acquisition to create the printing plate (real plate) 250A. The printer 300 creates the printed matter (real printed matter) 400A by using the printing plate 250A.

The plate measurement unit 500 serves as a device for measuring shapes of dots on the printing plate (real plate) 250A created by the plate-making device 200 and an on-plate dot area rate showing a ratio of area occupied by dots (a region A12 in FIG. 11B) in a region (a region A10 in FIG. 11B) of a predetermined area (unit area) on the printing plate 250A. The measurement value of the on-plate dot area rate is inputted from the plate measurement unit 500 to the exposure response characteristics estimation unit 504. In addition, the vipFLEX of X-Rite make (http://www.sdg-net.co.jp/products/x-rite/products_detail/vip_flex.html), the FlexoCam of Provident make (http://www.providentgrp.com/), and the like are available as the plate measurement unit 500, for example.

The printed matter measurement unit 502 measure shapes of dots on the printed matter (real printed matter) 400A created by using the printing plate 250A and an on-printed-matter dot area rate showing a ratio of area occupied by dots in a region of a predetermined area (unit area) on the printed matter 400A.

The measurement value of the on-printed-matter dot area rate is inputted from the printed matter measurement unit 502 to the printing response characteristics estimation unit 506. In addition, the SpectroPlate of Techkon make (http://www-.techkon.co.jp/Products_Techkon_SP_Top.html), the 500 series of X-Rite make (http://www.sdg-net.co.jp/products/x-rite/products_detail/500_series.html), and the like are available as the printed matter measurement unit, for example.

The exposure response characteristics estimation unit 504 and the printing response characteristics estimation unit 506 may be provided in an apparatus separate from the image processing apparatus 100 or in the image processing apparatus 100. In a case where the exposure response characteristics estimation unit 504 and the printing response characteristics estimation unit 506 are provided in the image processing apparatus 100, it is possible to input acquisition results by the exposure response characteristics estimation unit 504 and the printing response characteristics estimation unit 506 into the image processing apparatus 100 by communicatively connecting the exposure response characteristics estimation unit 504 and the printing response characteristics estimation unit 506 to the image processing apparatus 100.

Estimation processing of exposure (engraving) response characteristics will be described below.

Figure 12A:
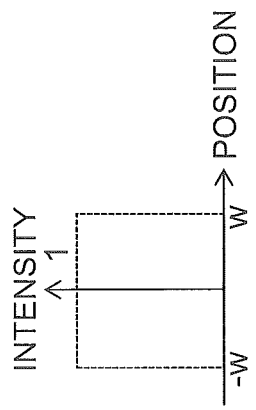
FIGS. 12A to 12F are graphs showing examples of exposure response characteristics.
Figure 12B:
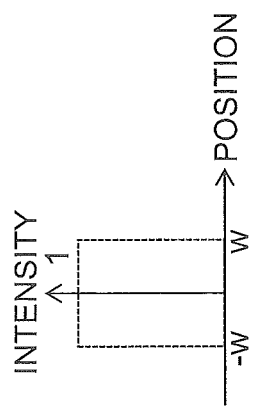
Figure 12C:
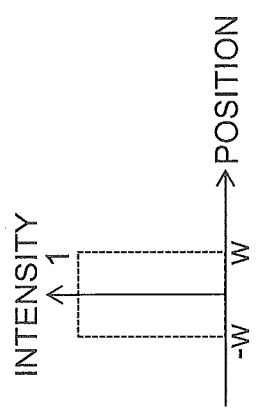
Figure 12D:
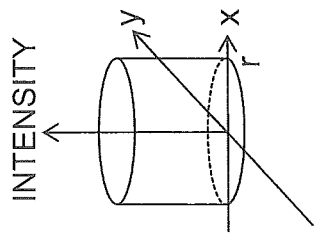
Figure 12E:
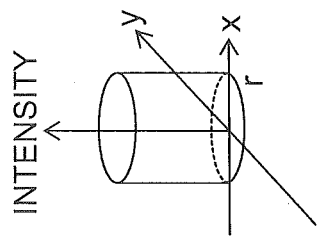
Figure 12F:
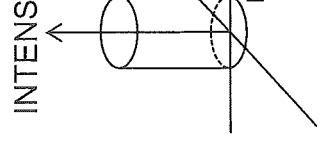
Figure 13:
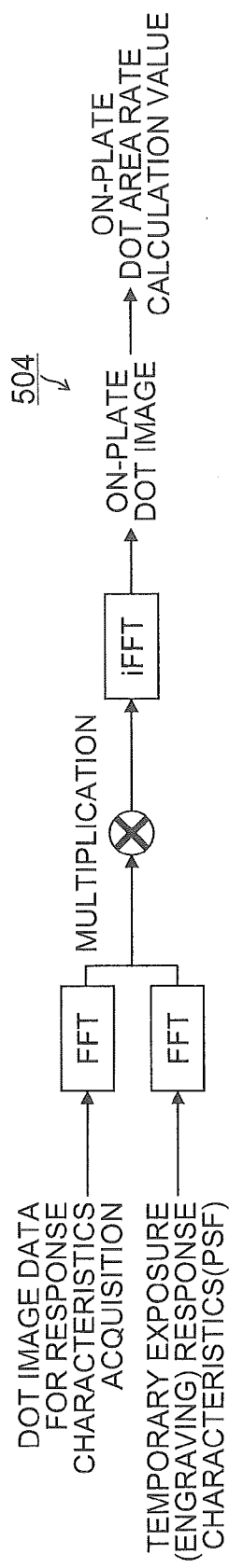
FIG. 13 is a block diagram showing a configuration of an exposure response characteristics estimation unit.

FIGS. 12A to 12F are graphs showing examples of exposure response characteristics, and FIG. 13 is a block diagram showing a configuration of the exposure response characteristics estimation unit 504.

As shown in FIGS. 12A to 12C, when dots are exposed (engraved) on a material (plate material) of the printing plate 250A, exposure (engraving) response characteristics showing an engravable range on a surface of the plate material is supposed as a rectangular function (delta function) (in fact, the exposure response characteristics is supposed as a cylindrical function on a two-dimensional plane (plate material surface, or xy plane) as shown in FIGS. 12D to 12F, however, it is supposed as above for easy explanation). The exposure response characteristics indicate spread of portions other than dots (a white region), which occurs when portions other than dots (a white region in FIG. 11B) are exposed with a laser at the time of exposure (engraving). A concept of the exposure response characteristics is similar to that of a "Point Spread Function" (PSF) indicating spread of a point light source in an optics field and the like.

Next, a calculation value of an on-plate dot area rate corresponding to a dot image for characteristics acquisition is calculated by using temporary exposure response characteristics acquired by varying a width w (radius r of the circle of a cylindrical function in a case of a two-dimensional plane) of a rectangular function. Specifically, as shown in FIG. 13, the exposure response characteristics estimation unit 504 receives input of dot image data for response characteristics acquisition and temporary exposure response characteristics to apply FFT processing to the dot image data for response characteristics acquisition and the temporary exposure response characteristics. The exposure response characteristics estimation unit 504 then multiplies the dot image data for response characteristics acquisition and the temporary exposure response characteristics together after the FFT processing is applied to them, and then creates an on-plate dot image showing arrangement and shapes of dots to be formed on the printing plate 250A on the basis of the temporary exposure response characteristics by applying iFFT processing to them. The exposure response characteristics estimation unit 504 then calculates an on-plate dot area rate with respect to the on-plate dot image created on the basis of the temporary exposure response characteristics.

The exposure response characteristics estimation unit 504 varies the width w (radius r of the circle of a cylindrical function in a case of a two-dimensional plane) of the rectangular function to repeat calculation of the on-plate dot area rate based on the temporary exposure response characteristics. The exposure response characteristics estimation unit 504 then determines that temporary exposure response characteristics by which a measurement value of the on-plate dot area rate above becomes closest to a calculation value of the on-plate dot area rate (an absolute value of a difference between a measurement value of the on-plate dot area rate and a calculation value of the on-plate dot area rate becomes minimum, or equal to or less than a threshold, for example) serves as an actual exposure response characteristics.

In the example above, the exposure response characteristics are supposed as a rectangular function, but may be supposed as a gauss function, for example. In this case, temporary exposure response characteristics may be calculated by varying a half-value width of the gauss function. In a case of a two-dimensional plane, a curved surface to be acquired by rotating a gauss function around a normal line of a plate material surface (xy plane) may be supposed to calculate temporary exposure response characteristics by varying a half-value width of the curved surface.

In addition, if a beam spot diameter of a laser engraving machine is known, a value of the beam spot diameter may serve as a width of a rectangular function or a half-value width of a gauss function without performing exposure response characteristics estimation.

Estimation processing of printing response characteristics will be described below.

Figure 14:
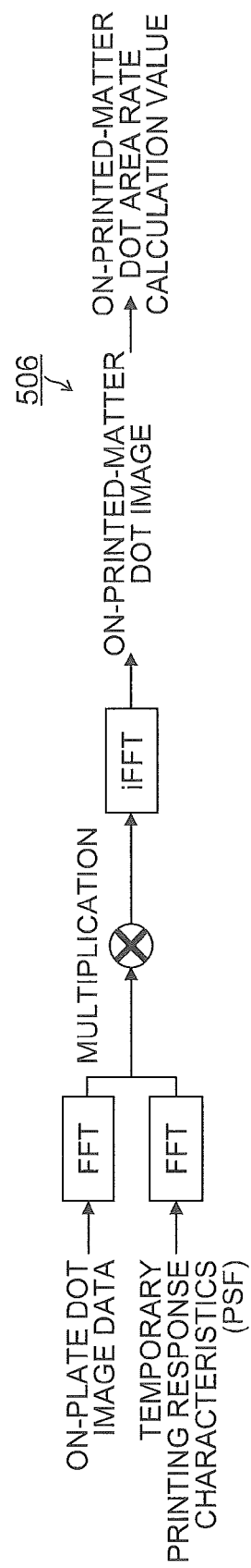
FIG. 14 is a block diagram showing a configuration of a printing response characteristics estimation unit.

FIG. 14 is a block diagram showing a configuration of a printing response characteristics estimation unit 506.

In the estimation processing of printing response characteristics as well as in the estimation processing of exposure response characteristics, printing response characteristics showing a range of points to be reproduced on the printed matter 400A when dots are printed on the printed matter 400A by using the printing plate 250A is supposed as a rectangular function (in fact, the printing response characteristics is supposed as a function with respect to a two-dimensional plane (a printing surface of the printed matter 400A, xy plane), however, it is supposed as above for easy explanation). The printing response characteristics show spread of dot portions (a black region in FIG. 11C) caused by spread deformation of letterpress, spread of ink, and the like, which occurs by pressing the printing plate 250A on a paper sheet at the time of printing. A concept of the printing response characteristics is similar to that of the "Point Spread Function" (PSF) indicating spread of a point light source in an optics field and the like.

Next, a calculation value of an on-printed-matter dot area rate corresponding to an on-plate dot image is calculated by using temporary printing response characteristics acquired by varying a width w (radius r of the circle of a cylindrical function in a case of a two-dimensional plane) of a rectangular function. As the on-plate dot image, a calculated dot image in which a calculation value of an on-plate dot area rate becomes closest to a measurement value at the time of exposure response characteristics estimation as well as an on-plate dot image that is actually measured by the plate measurement unit 500 is available.

As shown in FIG. 14, the printing response characteristics estimation unit 506 receives input of on-plate dot image data and temporary printing response characteristics to apply FFT processing to the on-plate dot image data and the temporary printing response characteristics. The printing response characteristics estimation unit 506 then multiplies the on-plate dot image data and the temporary printing response characteristics together after the FFT processing is applied to them, and then creates an on-printed-matter dot image showing arrangement and shapes of dots to be formed on the printed matter 400A on the basis of the temporary printing response characteristics by applying iFFT processing to them. The printing response characteristics estimation unit 506 then calculates an on-printed-matter dot area rate with respect to the on-printed-matter dot image created on the basis of the temporary printing response characteristics.

The printing response characteristics estimation unit 506 varies the width w (radius r of the circle of a cylindrical function in a case of a two-dimensional plane) of the rectangular function to repeat calculation of the on-printed-matter dot area rate based on the temporary printing response characteristics. The printing response characteristics estimation unit 506 then determines that the temporary printing exposure response characteristics by which a measurement value of the on-printed-matter dot area rate above becomes closest to a calculation value of the on-printed-matter dot area rate (an absolute value of a difference between a measurement value of the on-printed-matter dot area rate and a calculation value of the on-printed-matter dot area rate becomes minimum, or equal to or less than a threshold, for example) serves as an actual printing response characteristics.

In the example above, the printing response characteristics are supposed as a rectangular function, but may be supposed as a gauss function, for example. In this case, temporary printing response characteristics may be calculated by varying a half-value width of the gauss function. In a case of a two-dimensional plane, a curved surface to be acquired by rotating a gauss function around a normal line of a printing surface (xy plane) of the printed matter 400A may be supposed to calculate temporary printing response characteristics by varying a half-value width of the curved surface.

Image quality evaluation value calculation processing will be described below.

The image quality evaluation value calculation unit (image quality evaluation value calculation device) 116 shown in FIG. 2 calculates an image quality evaluation value (Q) for each of candidates of dot threshold data on the basis of a dot overlapping solid brightness image created by the dot overlapping simulation unit 114.

Figure 15:
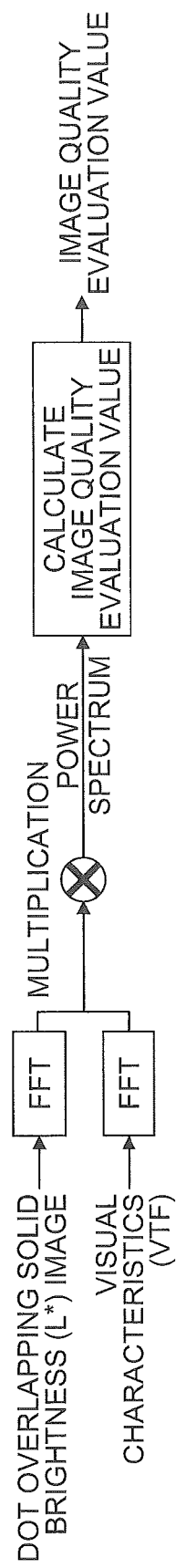
FIG. 15 is a block diagram showing calculation processing in an image quality evaluation value calculation unit.

FIG. 15 is a block diagram showing calculation processing in an image quality evaluation value calculation unit 116.

As shown in FIG. 15, the image quality evaluation value calculation unit 116 applies high speed Fourier transformation (FFT) processing to a dot tint overlapping solid brightness image (dot overlapping solid brightness image) created by the dot overlapping simulation unit 114 to acquire a power spectrum of the dot overlapping solid brightness image. It is preferable that, in order to prevent aliasing at the time of the FFT processing, the least common multiple of the numbers of pixels of dot threshold data corresponding to respective colors of CMYK serves as the number of pixels of a dot overlapping solid brightness image. Alternatively, it is more preferable that any number of pixels serves as a range of a dot overlapping solid brightness image to apply a window function, in which the number of pixels within the range is indicated as 1, and the number of pixels out of the range is indicated as 0, to a pixel value of the dot overlapping solid brightness image, and then the FFT processing is performed.

In addition, the image quality evaluation value calculation unit 116 stores visual characteristics (Visual Transfer Function: VTF) in a storage device (memory, not shown). The visual characteristics show space frequency characteristics of human vision. As the visual characteristics, the VTF (Expression 2) of Dooley is available, for example.

$$VTF = 5.05e^{-0.138u}(1 - e^{0.1u}),$$ [Expression 1]

$$u = \frac{\pi L f_r}{180} \text{[cycles/deg]}$$

In Expression 2, L indicates an observation distance (mm), and $f_r$ indicates a space frequency (cycles/mm).

Figure 16:
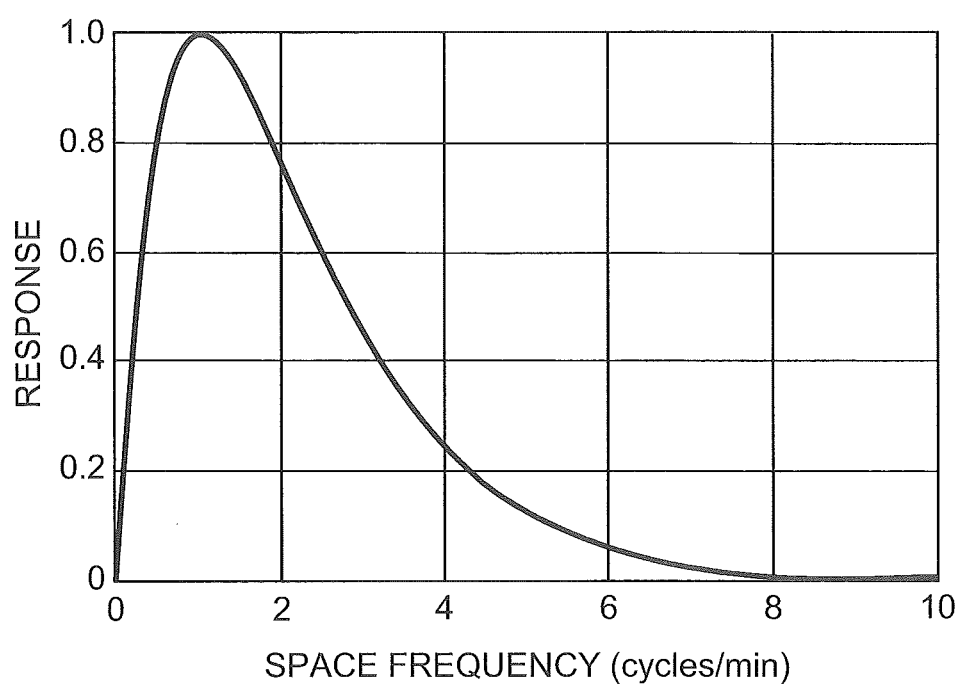
FIG. 16 is a graph showing visual characteristics (Dooley-Shaw function) in a case where an observation distance (L) is set at 300 mm.

FIG. 16 is a graph showing visual characteristics (Dooley-Shaw function) in a case where an observation distance (L) is set at 300 mm. In FIG. 16, a space frequency (cycles/mm) is indicated in a horizontal axis, and a value of VTF (normalized) is indicated in a vertical axis.

A function shape of visual characteristics is not limited to the Dooley-Shaw function shown in FIG. 16. A variety of characteristics based on a mathematical model and experimental data may be applicable, for example. In addition, since the observation distance of 300 (mm) when the visual characteristics are calculated is an example, the present invention is not limited to the distance. A user may determine the observation distance L when the visual characteristics are calculated, depending on an observation aspect of an image and the like, for example.

The image quality evaluation value calculation unit 116 applies the FFT processing to visual characteristics to acquire a power spectrum of the visual characteristics. In addition, the image quality evaluation value calculation unit 116 calculates an image quality evaluation value on the basis of a power spectrum acquired by multiplying a power spectrum of a dot overlapping solid brightness image and the power spectrum of the visual characteristics together. Specifically, the image quality evaluation value calculation unit 116 calculates (A) an average value of power spectra, (B) a maximum value of power spectra, or (C) a weighted sum of an average value and a maximum value of power spectra, as an image quality evaluation value. The image quality evaluation value calculated by the image quality evaluation value calculation unit 116 is outputted to a total evaluation value calculation unit 118.

FIGS. 17A to 17D are graphs showing examples of a power spectrum of a dot overlapping solid brightness image. In FIGS. 17A to 17D, a space frequency (cycles/mm) is indicated in a horizontal axis, and a value of a power spectrum (normalized) is indicated in a vertical axis.

In the power spectra of dot overlapping solid brightness images described in FIGS. 17A to 17D, a power spectrum of visual characteristics (VTF) is multiplied, therefore, a power spectrum value of a region (a frequency region in which a space frequency is about 6 cycles/mm or more, for example), which is hardly recognized by human vision, is relatively small.

In an example shown in FIG. 17A, a large peak appears in a low frequency region (about 1 cycle/mm). As a result, in a case of FIG. 17A, a moire can be easily visually recognized in the printed matter 400.

In an example shown in FIG. 17B, a large peak appears in a region whose frequency is higher than that of the low frequency region in FIG. 17A and which can be recognized by human vision (about 4.5 cycles/mm). As a result, in a case of FIG. 17B, a rosette pattern can be easily visually recognized in the printed matter 400.

In an example shown in FIG. 17C, power spectrum values are relatively high over approximately the whole region (about 0 to about 6 cycles/mm) which can be recognized by human vision, therefore, noise and granular feeling can be easily visually recognized in the printed matter 400.

In an example shown in FIG. 17D, power spectrum values are low to the extent that deterioration in image quality of the printed matter 400 is out of the question over approximately the whole region (about 0 to about 6 cycles/mm) which can be recognized by human vision.

Since numeric values in the vertical axis in FIGS. 17A to 17D are only an example, reference of a power spectrum value to which deterioration in image quality is out of the question can vary depending on the extent of image quality to be required in the printed matter 400.

Table 2 shows calculation examples of image quality evaluation values. The examples 1 to 4 in Table 2 correspond to image quality evaluation values calculated on the basis of power spectra in FIGS. 17A to 17D, respectively.

TABLE 2

| Image quality evaluation value | Example 1 | Example 2 | Example 3 | Example 4 |
|---|---|---|---|---|
| (A) Average value of power spectra | 0.12 | 0.12 | 0.26 | 0.10 |

TABLE 2-continued

| Image quality evaluation value | Example 1 | Example 2 | Example 3 | Example 4 |
|---|---|---|---|---|
| (B) Maximum value of power spectra | 0.89 | 0.94 | 0.61 | 0.38 |
| (C) Weighted sum of an average value and a maximum value of power spectra | 1.01 | 1.06 | 0.87 | 0.48 |

Even in a case where any one of (A) an average value of power spectra, (B) a maximum value of power spectra, and (C) a weighted sum of an average value and a maximum value of power spectra, serves as an image quality evaluation value, as the image quality evaluation value decreases, the power spectrum value decreases, thereby improving image quality. In the examples shown in Table 2, even in a case where any one of image quality evaluation values of (A) to (C) is used, the image quality evaluation value of the example 4 (FIG. 17D) is minimum, therefore, it is evaluated that image quality of the example 4 (FIG. 17D) is most favorable.

In addition, in the examples shown in Table 2, both weight coefficients with respect to (A) an average value of power spectra and (B) a maximum value of power spectra, when (C) a weighted sum of an average value and a maximum value of power spectra is calculated, are 1.0, whereby (C)=(A)+(B). A value of the weight coefficient is not limited to 1.0, therefore, a user may vary the value depending on application of the printed matter 400, and the like. In a case, for example, where a peak of a specific frequency component, such as a moire and a rosette pattern, is to be reduced, a weight coefficient to be applied to (B) a maximum value of power spectra should be larger than a weight coefficient to be applied to (A) an average value of power spectra. In addition, in a case where noise and granular feeling, in which there is no peak in a specific frequency component, are to be reduced, a weight coefficient to be applied to (A) an average value of power spectra should be larger than a weight coefficient to be applied to (B) a maximum value of power spectra.

Total evaluation value calculation processing will be described below.

The total evaluation value calculation unit (total evaluation value calculation device) 118 calculates a total evaluation value (V) for each of candidates of dot threshold data and for each of candidates of device signal values on the basis of a color evaluation value (E) for each of the candidates of dot threshold data and for each of the candidates of device signal values, the color evaluation value (E) being received through the color evaluation value holding unit 110, and an image quality evaluation value (Q) for each of the candidates of dot threshold data and for each of the candidates of device signal values, the image quality evaluation value (Q) being calculated by the image quality evaluation value calculation unit 116. The total evaluation value (V) is calculated by weighting addition shown in Expression 3 below in a case where a weight coefficient to be applied to the color evaluation value is indicated as We, and a weight coefficient to be applied to the image quality evaluation value is indicated as Wq.

$$V = We \times E + Wq \times Q \qquad \text{[Expression 3]}$$

In addition, the total evaluation value may be calculated by adding an evaluation value other than the color evaluation value (E) and the image quality evaluation value (Q). Examples of an evaluation value other than the color evaluation value (E) and the image quality evaluation value (Q) are as follows: an ink cost evaluation value; an evaluation value related to an expiration date of ink (an index for determining distribution of ink so that ink close to an expiration date is consumed on a priority basis); an evaluation value of spectral characteristics (whether to be close to spectral characteristics of a spot color ink of a reproduction target), and the like.

The ink cost evaluation value (I) for evaluating ink cost is calculated by an ink cost evaluation value calculation device (not shown) as described below. The ink cost evaluation value I can be expressed by the following expression, where a dot area rate of each of CMYK candidates is indicated as C, M, Y, and K, and cost of each ink of CMYK per 1 kg is indicated as follows: C ink is Ic, M ink is Im, Y ink is Iy, and K ink is Ik.

$$I = Ic \times C + Im \times M + Iy \times Y + Ik \times K \qquad \text{[Expression 4]}$$

A total evaluation value is expressed by Expression 5 described below, where a weight coefficient to be applied to the ink cost evaluation value is indicated as Wi.

$$V = We \times E + Wq \times Q + Wi \times I \qquad \text{[Expression 5]}$$

In Expression 3 or 5 above, a user may determine values of the weight coefficients We, Wq, and Wi through an input device (weight coefficient setting device) depending on application of the printed matter 400 and the like. In a case, for example, where a higher premium is put on reproducibility of colors than deterioration in image quality caused by a moire, a rosette pattern, or noise (in a case of an image containing colors with positions close to each other in a hue circle, for example), We should be larger than Wq. In addition, in a case where deterioration in image quality and increase in color difference should be prevented even if ink cost increases, a value of Wi should be lower than values of We and Wq or Expression 3 should be used.

Dot threshold data determination processing and optimum device signal value determination processing will be described below.

The optimal values determination unit 120 determines optimum dot threshold data from among candidates of dot threshold data on the basis of the total evaluation value (V) calculated by the total evaluation value calculation unit 118, and determines optimum device signal values (CMYK) from among candidates of device signal values. In addition, the optimal values determination unit 120 determines a dot threshold data candidate and a device signal value candidate in a case where the total evaluation value (V) becomes minimum as an optimum dot threshold data piece and an optimum device signal value (color separation result), respectively.

A color separation method will be described below.

Figure 18:
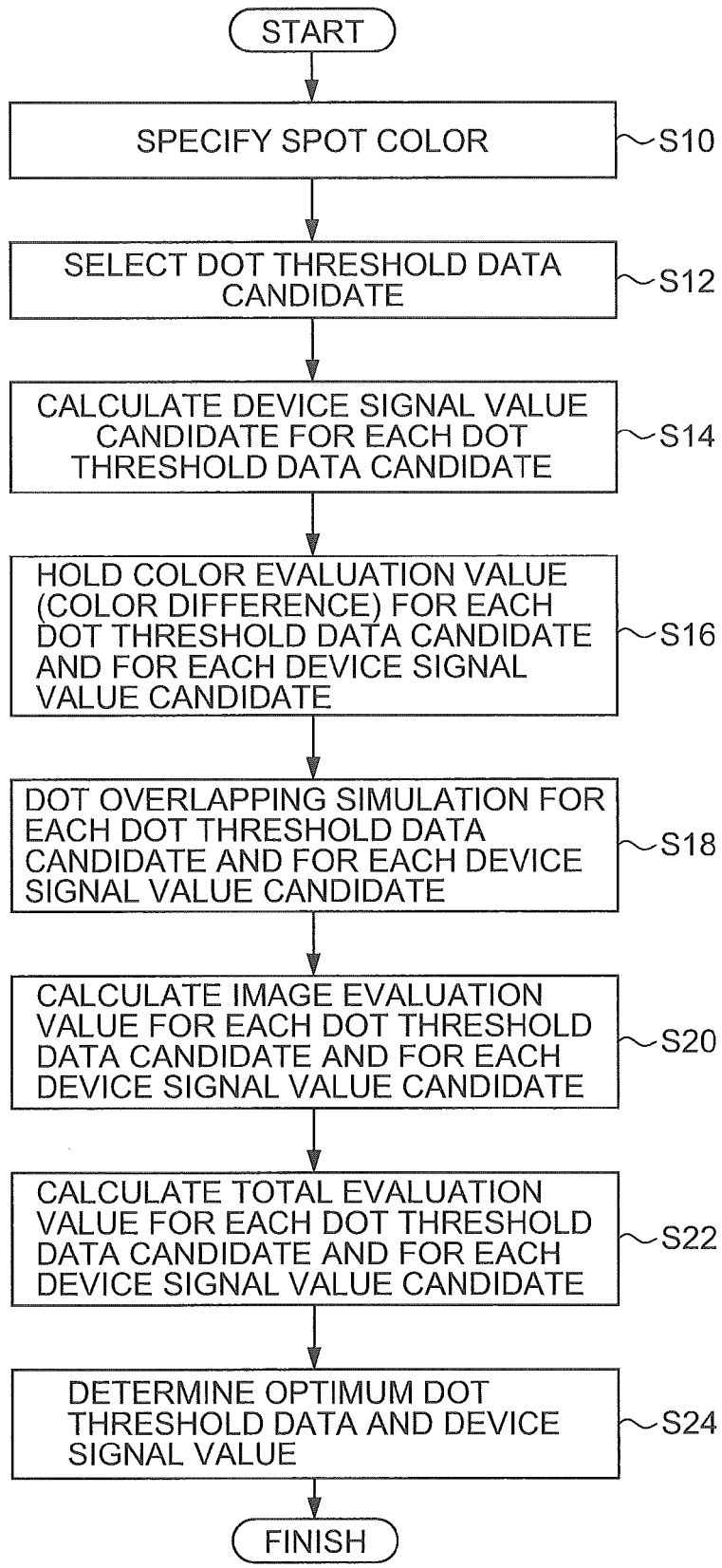
FIG. 18 is a flow chart showing color separation processing according to one embodiment of the present invention.

FIG. 18 is a flow chart showing color separation method according to one embodiment of the present invention.

First, the image processing apparatus 100 specifies target values (spot colors) of colors to be reproduced on the printed matter 400 (step S10). Specifying spot colors is performed by receiving input of spot color IDs or by allowing the colorimetry unit 104 to measure color of color chips and the like.

Next, the dot candidate selection unit 122 selects a candidate of dot threshold data from among the dot threshold data stored in the dot threshold data storage unit 112 (step S12).

The device signal value candidate calculation unit 106 then acquires a print profile from the print profile storage unit 108. In addition, the device signal value candidate calculation unit 106 calculates a candidate of device signal values (device signal value candidate), which can reproduce a target Lab value to be reproduced on recording paper (target Lab value) within a range of allowable color differences, on the basis of the acquired print profile, for each of dot threshold data candidates (step S14). A color difference acquired for each of candidates of device signal values in the step S14 is held in the color evaluation value holding unit 110 as a color evaluation value of each of device signal value candidates (step S16).

Next, the dot overlapping simulation unit 114 simulates an image to be printed when a dot image corresponding to each of color materials (process colors, for example) is printed (step S18). The image quality evaluation value calculation unit 116 calculates an image quality evaluation value of each of device signal value candidates on the basis of the simulation result (step S20).

The total evaluation value calculation unit 118 calculates a total evaluation value for each dot threshold data candidates and for each device signal value candidates on the basis of the color evaluation value and the image quality evaluation value above (step S22), and an optimum dot threshold data piece and an optimum device signal value are determined from among the dot threshold data candidates and the device signal value candidates, respectively, on the basis of the total evaluation value (step S24). In the step S22, the total evaluation value may be calculated by using an evaluation value other than the color evaluation value and the image quality evaluation value. In addition, in the step S22, a user may input a weight coefficient to be applied to an evaluation value to be used in calculation of the total evaluation value.

According to the present embodiment, since color separation is performed by using an image quality evaluation value calculated by using a power spectrum of a dot overlapping solid brightness image and a power spectrum of visual characteristics in addition to a color difference evaluation value showing an amplitude of color difference, it is possible to prevent an image formation such as a moire and a rosette pattern from occurring while color difference occurring between a spot color and a color system is prevented.

In addition, according to the present embodiment, by performing dot overlapping simulation, it is possible to select optimum dot threshold data capable of preventing a color difference and preventing an image formation from occurring by a simpler calculation without printing and measuring a patch for each device signal value, thereby enabling optimum color separation to be achieved.

Others will be described below.

In the present embodiment, an optimum device signal value is to be determined corresponding to designation by a spot color ID or a spot color measured by the colorimetry unit 104, however, the present invention is not limited to the manner above. It is allowed, for example, to calculate an optimum color separation result for all available spot colors (spot colors listed in a color sample book of an ink manufacturer, such as Pantone, for example) in advance to make a database (tabulation). In this case, the image processing apparatus 100 may acquire optimum color separation by referring to a database (table) on the basis of a spot color designated by a spot color ID or measured by the colorimetry unit 104.

In addition, a user may select an optimum device signal value in accordance with an evaluation result (evaluation value) of a color separation result.

FIG. 19 is a diagram showing a Graphical User Interface (GUI) to select a color separation result.

In examples shown in FIG. 19, there are displayed color difference evaluation values with respect to three sets of device signal values (CMYK values of (c1, m1, y1, k1), (c2, m2, y2, k2), and (c3, m3, y3, k3)), image quality evaluation values and ink cost evaluation values, as well as target colors of an object to be printed on the printed matter 400 and samples of reproduction colors to be actually printed. Although the color difference evaluation values, the image quality evaluation values, and ink cost evaluation values are displayed at four levels of A, B, C, and D for easy understanding by a user (a color difference of 0 to less than 1.5, 1.5 to less than 3.0, 3.0 to less than 5.0, and 5.0 or more, are indicated as A, B, C, and D, respectively, for example), numeric values of respective evaluation values may be displayed.

A user may operate a "determination" button displayed on a right side of each of the CMYK values (c1, m1, y1, k1), (c2, m2, y2, k2), and (c3, m3, y3, k3) by using a pointing device (not shown) and the like so that a desired CMYK value (color separation result) can be selected.

In the GUI shown in FIG. 19, for example, a dot overlapping solid brightness image acquired by the dot overlapping simulation may be displayed. In addition, a GUI for calculating total evaluation values formed by specifying a weight coefficient to be applied to each of the evaluation values may be displayed together.

A color separation method in accordance with the present invention can be provided also as computer-readable program codes to allow a processor to perform the processing described above, non-transitory and computer-readable recording media storing the program codes (an optical disk such as a Compact Disc (CD), a Digital Versatile Disc (DVD), and a Blu-ray (registered trademark) Disc (BD), a magnetism disk such as a hard disk, and a magneto-optical disk, and a Universal Serial Bus (USB) memory, for example), and a computer program product storing executable codes for the method described above.

What is claimed is:

1. A color separation apparatus comprising:
   a target value acquisition device which acquires target values of colors to be reproduced in a printer from continuous-tone image data when the printer creates binary image data showing shape and arrangement of dots constituting an image for each color material;
   a dot threshold data candidate selection device which acquires candidates of dot threshold data including information on a threshold for each the dots for converting the continuous-tone image data into binary image data for each color material;
   a print profile acquisition device which acquires a print profile showing correspondence between device signal values and color system values in the printer for each of the candidates of dot threshold data; and
   a color separation device which allows the printer to calculate candidates of the device signal values on the basis of the target values of colors acquired by the target value acquisition device and the print profile, and determines dot threshold data for reproducing colors corresponding to the target values on the basis of the candidates of dot threshold data and the print profile from among the candidates of dot threshold data, as well as determines device signal values for reproducing colors corresponding to the target values from among the candidates of device signal values.

2. The color separation apparatus according to claim 1, wherein the target value acquisition device acquires target values of colors to be reproduced in a printer by receiving input of an identifier for identifying a color or by measuring the colors.

3. The color separation apparatus according to claim 1, further comprising:
   a color evaluation value holding device which holds a color evaluation value showing a color difference between a device signal value and a color corresponding to the target value for each of the candidates of the device signal values; and
   an image quality evaluation value calculation device which calculates an image quality evaluation value for each of the candidates of the device signal values on the basis of the candidates of the dot threshold data and the print profile, wherein the color separation device determines dot threshold data and device signal values for reproducing colors corresponding to the target values on the basis of the color evaluation value and the image quality evaluation value.

4. The color separation apparatus according to claim 3, further comprising:

a weight coefficient setting device which determines a weight coefficient for each of the evaluation values; and a total evaluation value calculation device which calculates a total evaluation value for each of the candidates of the device signal values by performing weighting addition of each of the evaluation values by using the weight coefficient determined by the weight coefficient setting device, wherein the color separation device determines dot threshold data and device signal values for reproducing colors corresponding to the target values on the basis of the total evaluation value.

5. The color separation apparatus according to claim 3, wherein the target value acquisition device acquires target values of colors to be reproduced in a printer by receiving input of an identifier for identifying a color or by measuring the colors.

6. The color separation apparatus according to claim 3, further comprising: an ink cost evaluation value calculation device which calculates an ink cost evaluation value for each of the candidates of the device signal values on the basis of a dot area rate of each of color materials, wherein the color separation device determines the dot threshold data and the device signal values for reproducing colors corresponding to the target values on the basis of the color evaluation value, the image quality evaluation value, and the ink cost evaluation value.

7. The color separation apparatus according to claim 6, further comprising:

a weight coefficient setting device which determines a weight coefficient for each of the evaluation values; and a total evaluation value calculation device which calculates a total evaluation value for each of the candidates of the device signal values by performing weighting addition of each of the evaluation values by using the weight coefficient determined by the weight coefficient setting device, wherein the color separation device determines dot threshold data and device signal values for reproducing colors corresponding to the target values on the basis of the total evaluation value.

8. The color separation apparatus according to claim 6, wherein the target value acquisition device acquires target values of colors to be reproduced in a printer by receiving input of an identifier for identifying a color or by measuring the colors.

9. The color separation apparatus according to claim 3, further comprising:

a simulation device which applies binary coded processing to the candidates of the device signal values by using the dot threshold data to create binary image data for each of color materials for each of the candidates, and simulates an image formed by the printer on a printed matter by superimposing binary image data for each of the color materials, wherein the image quality evaluation value calculation device calculates the image quality evaluation value for each of the candidates on the basis of a result of the simulation of the image to be formed on the printed matter.

10. The color separation apparatus according to claim 9, further comprising:

a weight coefficient setting device which determines a weight coefficient for each of the evaluation values; and a total evaluation value calculation device which calculates a total evaluation value for each of the candidates of the device signal values by performing weighting addition of each of the evaluation values by using the weight coefficient determined by the weight coefficient setting device, wherein the color separation device determines dot threshold data and device signal values for reproducing colors corresponding to the target values on the basis of the total evaluation value.

11. The color separation apparatus according to claim 9, further comprising: an ink cost evaluation value calculation device which calculates an ink cost evaluation value for each of the candidates of the device signal values on the basis of a dot area rate of each of color materials, wherein the color separation device determines the dot threshold data and the device signal values for reproducing colors corresponding to the target values on the basis of the color evaluation value, the image quality evaluation value, and the ink cost evaluation value.

12. The color separation apparatus according to claim 11, further comprising:

a weight coefficient setting device which determines a weight coefficient for each of the evaluation values; and a total evaluation value calculation device which calculates a total evaluation value for each of the candidates of the device signal values by performing weighting addition of each of the evaluation values by using the weight coefficient determined by the weight coefficient setting device, wherein the color separation device determines dot threshold data and device signal values for reproducing colors corresponding to the target values on the basis of the total evaluation value.

13. The color separation apparatus according to claim 9, wherein the simulation device creates the binary image data in consideration of change in a shape of the dot occurring when the dot is printed by the printer on the basis of response characteristics at the time of forming dots corresponding to the binary image data in the printer.

14. The color separation apparatus according to claim 13, further comprising:

a weight coefficient setting device which determines a weight coefficient for each of the evaluation values; and a total evaluation value calculation device which calculates a total evaluation value for each of the candidates of the device signal values by performing weighting addition of each of the evaluation values by using the weight coefficient determined by the weight coefficient setting device, wherein the color separation device determines dot threshold data and device signal values for reproducing colors corresponding to the target values on the basis of the total evaluation value.

15. The color separation apparatus according to claim 13, further comprising: an ink cost evaluation value calculation device which calculates an ink cost evaluation value for each of the candidates of the device signal values on the basis of a dot area rate of each of color materials, wherein the color separation device determines the dot threshold data and the device signal values for reproducing colors corresponding to the target values on the basis of the color evaluation value, the image quality evaluation value, and the ink cost evaluation value.

16. The color separation apparatus according to claim 15, further comprising:
   a weight coefficient setting device which determines a weight coefficient for each of the evaluation values; and
   a total evaluation value calculation device which calculates a total evaluation value for each of the candidates of the device signal values by performing weighting addition of each of the evaluation values by using the weight coefficient determined by the weight coefficient setting device,
   wherein the color separation device determines dot threshold data and device signal values for reproducing colors corresponding to the target values on the basis of the total evaluation value.

17. The color separation apparatus according to claim 13, wherein the target value acquisition device acquires target values of colors to be reproduced in a printer by receiving input of an identifier for identifying a color or by measuring the colors.

18. The color separation apparatus according to claim 9, wherein the target value acquisition device acquires target values of colors to be reproduced in a printer by receiving input of an identifier for identifying a color or by measuring the colors.

19. A color separation method performed by a color separation apparatus and comprising the steps of:
   acquiring target values of colors to be reproduced in a printer from continuous-tone image data when the printer creates binary image data showing shape and arrangement of dots constituting an image for each of color materials;
   acquiring candidates of dot threshold data including information on a threshold for each of the dots, for converting the continuous-tone image data into binary image data for each of the color materials;
   acquiring a print profile showing correspondence between a device signal value and a color system value in the printer for each of the candidates of the dot threshold data; and
   a color separation step of:
   allowing the printer to calculate candidates of the device signal values on the basis of the target values of colors acquired in the target value acquisition step and the print profile;
   determining dot threshold data for reproducing colors corresponding to the target values on the basis of the candidates of the dot threshold data and the print profile from among the candidates of the dot threshold data; and
   determining device signal values for reproducing colors corresponding to the target values from among the candidates of the device signal values.

20. A non-transitory computer-readable medium storing a color separation program including codes allowing a computer to realize the functions of:
   a target value acquisition of acquiring target values of colors to be reproduced in a printer from continuous-tone image data when the printer creates binary image data showing shape and arrangement of dots constituting an image for each of color materials;
   a dot threshold data candidate selection of acquiring candidates of dot threshold data including information on a threshold for each of the dots, for converting the continuous-tone image data into binary image data for each of the color materials;
   a print profile acquisition of acquiring a print profile showing correspondence between a device signal value and a color system value in the printer for each of the candidates of the dot threshold data; and
   a color separation of allowing the printer to calculate candidates of the device signal values on the basis of the target values of colors acquired by the target value acquisition and the print profile, and determining dot threshold data for reproducing colors corresponding to the target values on the basis of the candidates of the dot threshold data and the print profile from among the candidates of the dot threshold data, as well as determining device signal values for reproducing colors corresponding to the target values from among the candidates of the device signal values.

* * * * *